(12) United States Patent
Kuwayama

(10) Patent No.: US 9,950,519 B2
(45) Date of Patent: Apr. 24, 2018

(54) LIQUID JETTING APPARATUS

(71) Applicant: BROTHER KOGYO KABUSHIKI KAISHA, Nagoya-shi, Aichi-ken (JP)

(72) Inventor: Tsuyoshi Kuwayama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/415,152

(22) Filed: Jan. 25, 2017

(65) Prior Publication Data

US 2017/0210127 A1 Jul. 27, 2017

(30) Foreign Application Priority Data

Jan. 25, 2016 (JP) .................................. 2016-011383

(51) Int. Cl.
*B41J 2/045* (2006.01)

(52) U.S. Cl.
CPC ....... *B41J 2/04573* (2013.01); *B41J 2/04508* (2013.01); *B41J 2/04586* (2013.01); *G03G 2215/00599* (2013.01); *H04N 2201/04767* (2013.01)

(58) Field of Classification Search
CPC ............... B41J 2/04573; B41J 2/04586; B41J 2/04508; H04N 2201/04767; G03G 2215/00599
See application file for complete search history.

(56) References Cited

U.S. PATENT DOCUMENTS

2014/0292867 A1  10/2014  Takata
2015/0029263 A1  1/2015  Arakane
2017/0129238 A1*  5/2017  Kuwayama .......... B41J 2/04505

FOREIGN PATENT DOCUMENTS

| JP | 2008-230069 A | 10/2008 |
| JP | 2008-254303 A | 10/2008 |
| JP | 2014-193531 A | 10/2014 |
| JP | 2015-024602 A | 2/2015 |

* cited by examiner

*Primary Examiner* — Yaovi M Ameh
(74) *Attorney, Agent, or Firm* — Scully, Scott, Murphy & Presser, PC

(57) ABSTRACT

There is provided a liquid jetting apparatus including a conveyor, a liquid jet head, a carriage, a carriage moving device, and a controller. The controller carries out printing by repeating a scan-printing operation and a conveyance operation, and carries out a process of determining a jet-timing such that the jet-timing and a predetermined reference timing may deviate oppositely from each other between a print area on the upstream side and a print area on the downstream side along a scanning direction for the carriage to move in the scan-printing operation with respect to a predetermined reference position in the scanning direction, based on a value of a correction parameter. The correction parameter is set to the same value for nozzles included in an identical one of nozzle groups and to different values for the corresponding nozzles included in different ones of the nozzle groups.

15 Claims, 12 Drawing Sheets

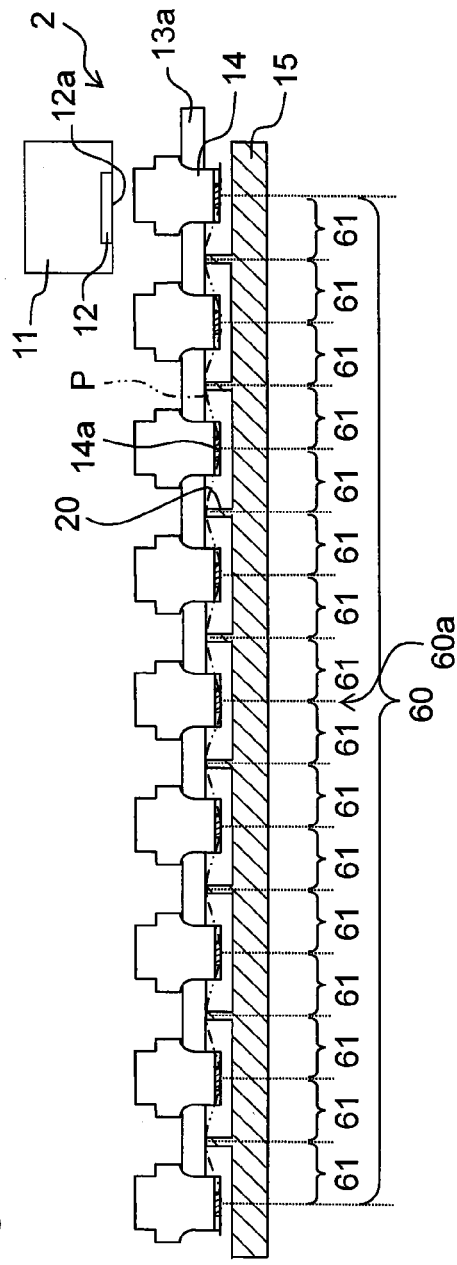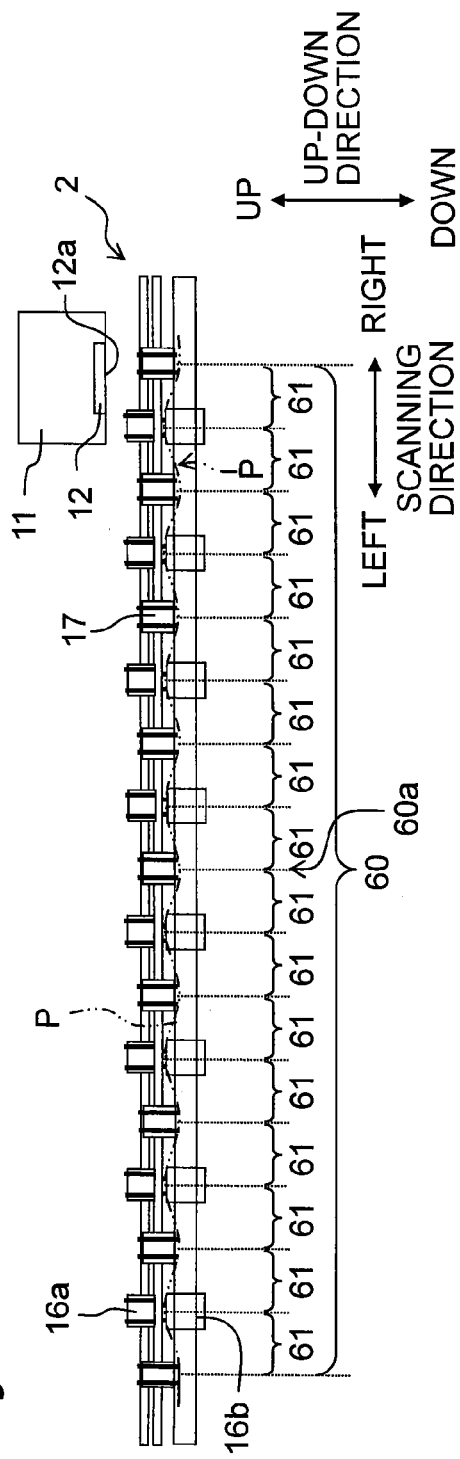

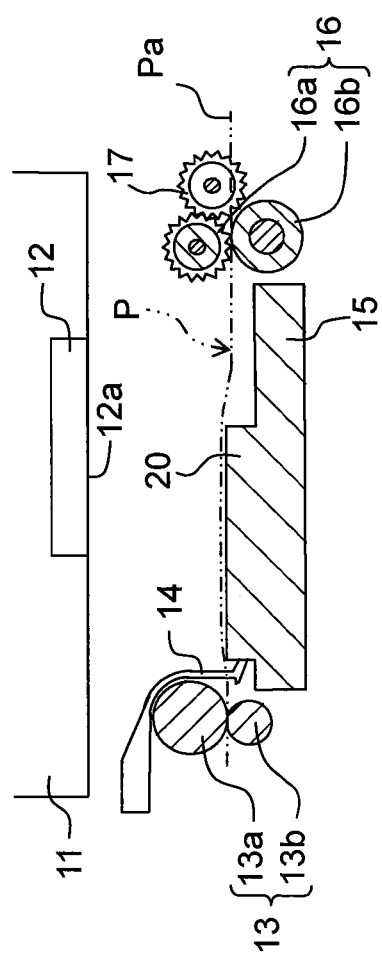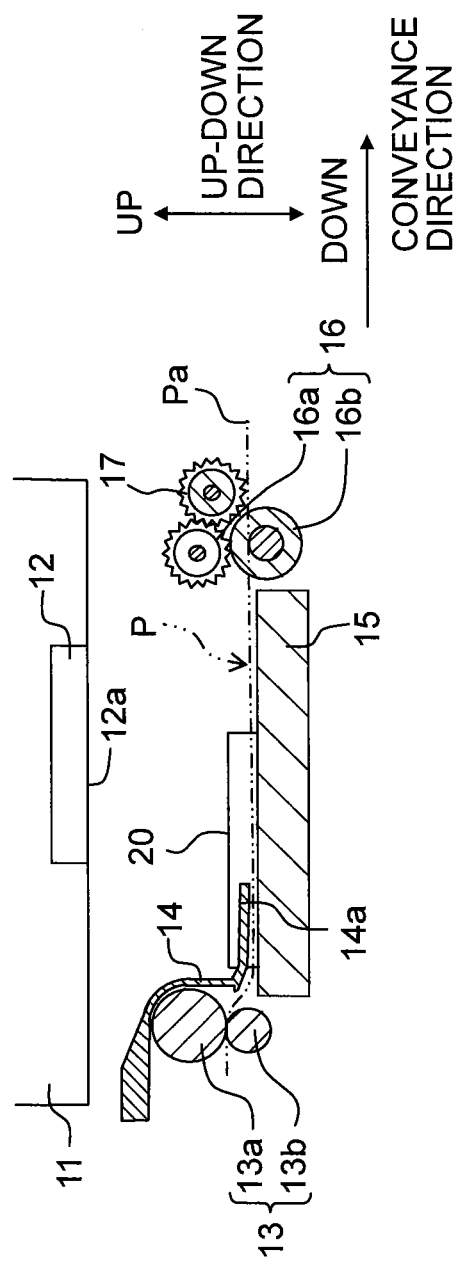
Fig. 4A
Fig. 4B

SCANNING
DIRECTION
LEFT ←——→ RIGHT

↓ CONVEYANCE
DIRECTION

SCANNING
DIRECTION
LEFT ⟵⟶ RIGHT
CONVEYANCE
DIRECTION

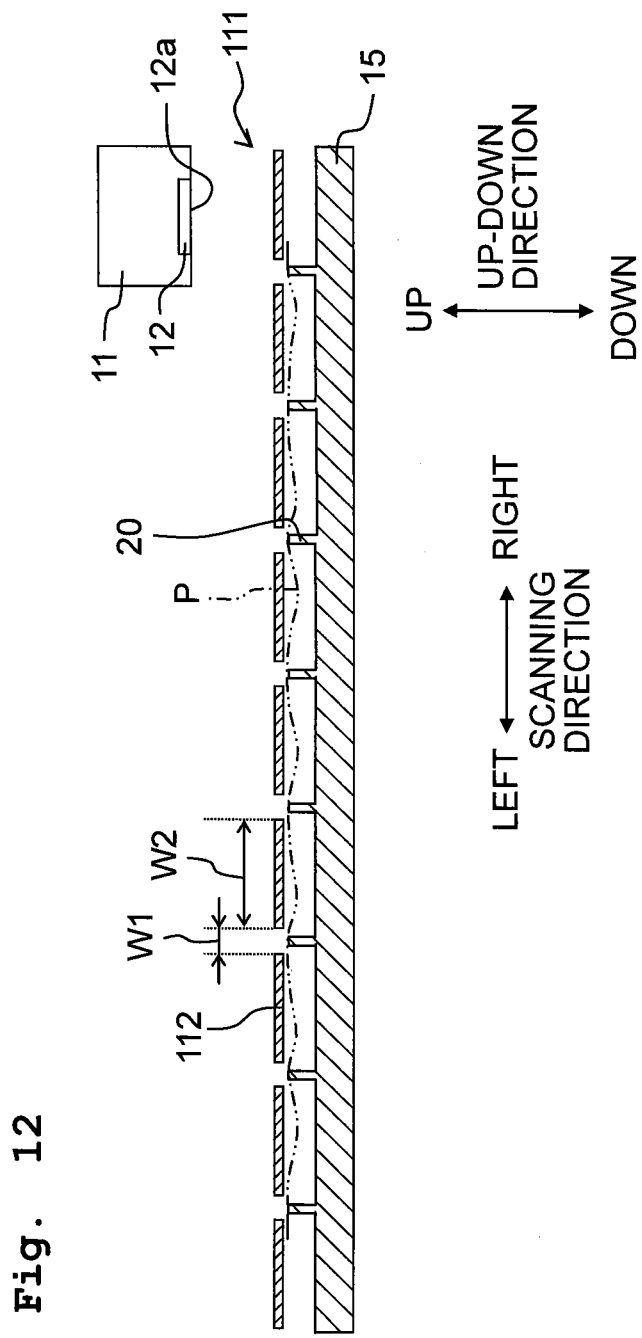

LIQUID JETTING APPARATUS

CROSS REFERENCE TO RELATED APPLICATION

The present application claims priority from Japanese Patent Application No. 2016-011383 filed on Jan. 25, 2016, the disclosure of which is incorporated herein by reference in its entirety.

FIELD OF THE INVENTION

The present invention relates to liquid jetting apparatuses jetting a liquid from nozzles.

DESCRIPTION OF THE RELATED ART

As an example of liquid jetting apparatuses jetting liquid from nozzles, there are publicly known printers jetting inks from nozzles to carry out printing on recording paper. For example, such a publicly known printer carries out printing on the recording paper by alternately carrying out a jetting-operation (scan-printing) of jetting the ink onto the recording paper placed on a platen and a conveyance operation on the recording paper with a conveyance mechanism, while moving an ink jet head integrally with a carriage in a scanning direction.

SUMMARY

Here, due to the abovementioned printer carrying out printing on the recording paper, when the inks adhere to the recording paper, then the recording paper may expand in the scanning direction by the swelling of the ink. Alternatively, the recording paper may contract in the scanning direction by the swelling of the ink. Hereinafter, this phenomenon is referred to as "the recording paper may expand/contract in the scanning direction by the swelling of the ink". Further, in the abovementioned printer, on the recording paper during printing, the inks adhere to the downstream part from the ink jet head whereas the inks do not adhere to the upstream part from the ink jet head, according to a conveyance direction. Therefore, on the recording paper during printing, difference may occur in the degree of the expansion/contraction in the scanning direction between the upstream part and the downstream part with respect to the ink jet head. Then, in the abovementioned printer, when such difference occurs in the degree of expansion/contraction of the recording paper, then the edge, according to the scanning direction, of the image printed in each scan-printing is subject to inclination with respect to the conveyance direction of the recording paper. Hence, the abovementioned edge is liable to be not positioned on a straight line for the whole printed image. As one example, on the recording paper of a cony exo-concave shape, the difference in the degree of expansion/contraction of the recording paper is more conspicuous on the upstream side in the conveyance direction from the ink jet head; therefore, the inclination of the edge of the image may increase with respect to the conveyance direction. Here, according to the inclination of the edge of the image printed in each scan-printing, between the scan-printings, by varying the jet-timing of the inks, it is conceivable to print the whole image such that the edge may be positioned on a straight line extending to be inclined with respect to the conveyance direction of the recording paper. However, in such cases, a great difference is liable to occur in the length of a margin in the scanning direction between upstream part and the downstream part in the conveyance direction, on the recording paper with the printed image.

It is an object of the present teaching to provide a liquid jetting apparatus capable of suppressing as much as possible the difference in the length of the margin of a recording medium in the scanning direction due to the positioning in the conveyance direction, while reducing as much as possible the deviation in the scanning direction in a connecting part of the image printed in the scan-printing due to the degree of expansion/contraction of the recording medium in the scanning direction (the length of the recording medium) varying with the position of the recording medium in the conveyance direction.

According to an aspect of the present teaching, there is provided a liquid jetting apparatus configured to discharge liquid toward a recording medium comprising:

a conveyor configured to convey the recording medium in a conveyance direction;

a liquid jet head including a plurality of nozzle groups which are arranged adjacent to each other in the conveyance direction to form an array of nozzles aligned in the conveyance direction;

a carriage on which the liquid jet head is mounted;

a carriage moving device configured to move the carriage in a scanning direction intersecting the conveyance direction; and a controller configured to control the conveyor, the liquid jet head, and the carriage moving device to:

print an image on the recording medium based on print data by repeating a scan-printing operation to jet the liquid from the nozzles while moving the carriage in the scanning direction and a conveyance operation to cause the conveyor to convey the recording medium in the conveyance direction after the scan-printing operation is finished; and determine, based on a value of a correction parameter, a jet-timing to jet the liquid from the nozzles in the scan-printing operation such that a jet-timing in a print area of the recording medium located upstream of a reference position in the scanning direction and a jet-timing in a print area of the recording medium located downstream of the reference position in the scanning direction deviate oppositely from each other with respect to a reference timing, wherein the correction parameter is set to a same value for the nozzles included in an identical one of the nozzle groups and is set to different values for the nozzles included in different ones of the nozzle groups.

According to the present teaching, the jet-timing is determined for the nozzles constituting the same nozzle group based on the correction parameter at the same value. Further, the jet-timing is determined for the nozzles constituting a certain nozzle group based on the correction parameter at a different value from the nozzles constituting another nozzle group. By virtue of this, compared with the case of determining the jet-timing based on the correction parameter at the same value for all of the plurality of nozzles, it is possible to reduce the deviation in the scanning direction in the connecting part of the printed images adjacent in the conveyance direction. Further, compared with the case of correcting the jet-timing to carry out printing such that the edge of the printed image may be positioned on one straight line, it is possible to suppress the difference in the length of the margin of the recording medium in the scanning direction due to the positioning in the conveyance direction.

BRIEF DESCRIPTION OF THE DRAWINGS

FIG. 3A is a cross-sectional view taken along the line IIIA-IIIA of FIG. 2;

FIG. 3B is an illustration of FIG. 2 viewed from the direction of the arrow IIIB;

FIG. 4A is a cross-sectional view taken along the line IVA-IVA of FIG. 2;

FIG. 4B is a cross-sectional view taken along the line IVB-IVB of FIG. 2;

FIG. 12 corresponds to FIG. 11A according to a third modification.

DESCRIPTION OF THE EMBODIMENTS

First Embodiment

A first embodiment of the present teaching will be explained below.

<Overall Configuration of an Ink Jet Printer>

Figure 1:
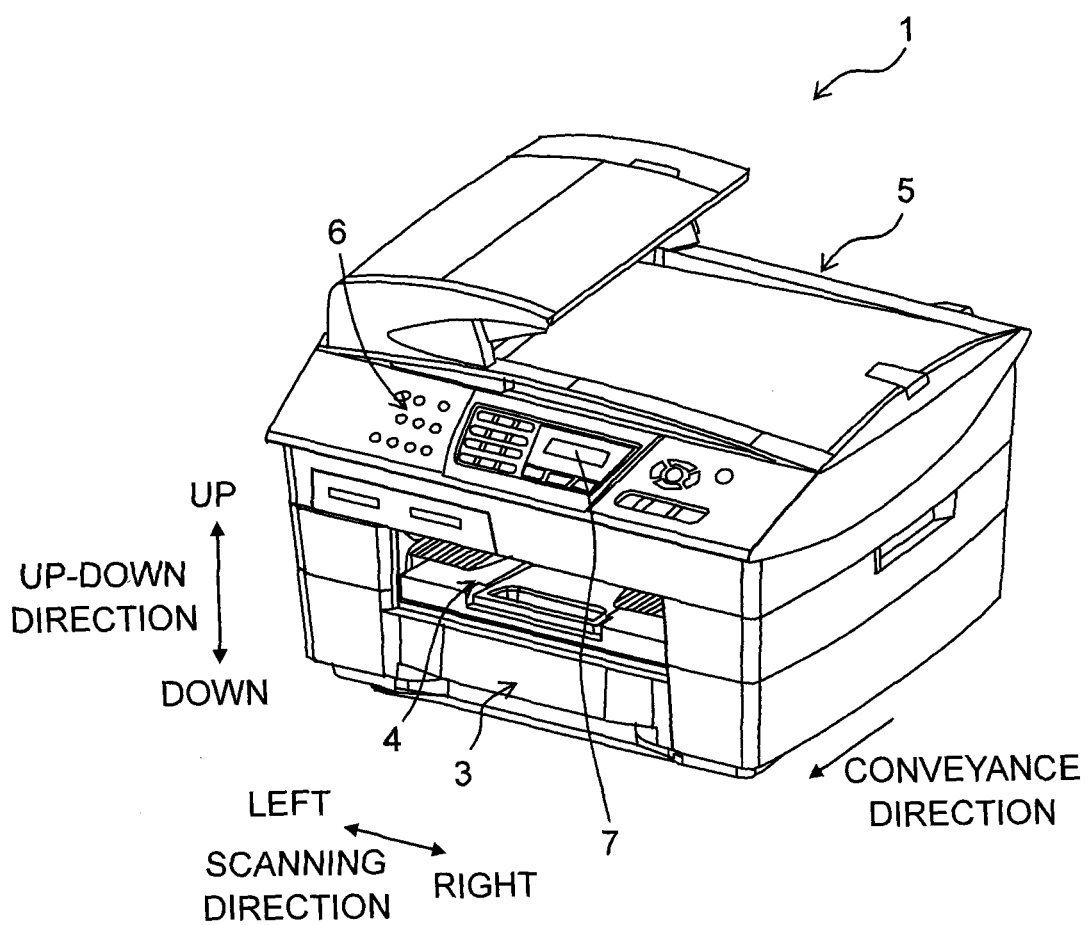
FIG. 1 is a schematic configuration diagram of a multifunction printer according to a few embodiments of the present invention.

An ink jet printer 1 according to the first embodiment (the "liquid jetting apparatus" of the present teaching) is a so-called multifunction printer capable of carrying out not only printing on recording paper P (the "recording medium" of the present teaching) but also reading of images and the like. The ink jet printer 1 includes, as depicted in FIG. 1, a printer section 2 (see FIG. 2), a feeding section 3, a discharge section 4, a reading section 5, an operation section 6, a display 7, and the like. Further, a controller 50 (see FIG. 5) controls the operation of the ink jet printer 1.

The printer section 2 is provided inside the ink jet printer 1 to carry out printing on the recording paper P. Further, the printer section 2 will be explained in detail later on. The feeding section 3 is configured to feed the recording paper P to the printer section 2. The discharge section 4 is configured so that the recording paper P is discharged after the printer section 2 has carried out printing thereon. The reading section 5 is a scanner or the like to carry out reading of manuscripts or documents. The operation section 6 includes operation buttons and the like for a user to operate those buttons of the operation section 6 so as to carry out necessary operations on the ink jet printer 1. The display 7 is a liquid crystal display or the like to display necessary information when the ink jet printer 1 is in use.

<The Printer Section>

Figure 2:
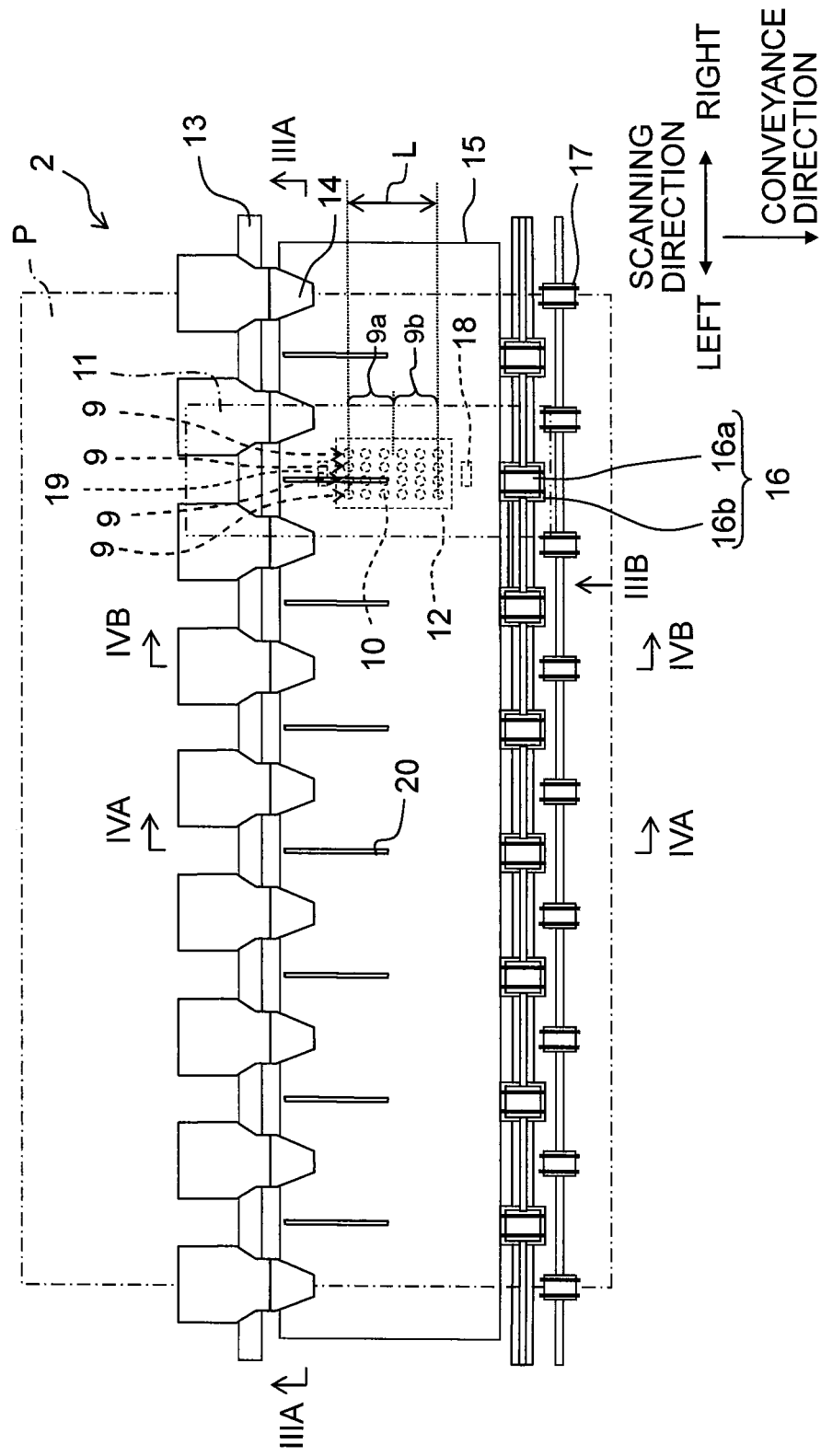
FIG. 2 is a plan view of a printer section of FIG. 1.

Next, the printer section 2 will be explained. As depicted in FIGS. 2 through 4A and 4B, the printer section 2 includes a carriage 11, an ink jet head 12 (the "liquid jet head" of the present teaching), a conveyance roller 13, a platen 15, nine corrugated plates 14, eight discharge rollers 16, nine corrugated spurs 17, an encoder 18, a media sensor 19, and the like. However, in order to make it easy to view the corrugated plates 14, aftermentioned ribs 20 and the like, FIG. 2 depicts the carriage 11 with a two-dot chain line and depicts with solid lines the members hidden behind the carriage 11, unseen in realty, and arranged below the carriage 11. Further, FIG. 2 omits illustration of guide rails and like supporting the carriage 11.

The carriage 11 is supported by the undepicted guide rails to be movable along a scanning direction. The carriage 11 is connected with a carriage motor 56 (see FIG. 5) via an undepicted belt or the like and driven by the carriage motor 56 to move reciprocatingly in the scanning direction. Further, in the first embodiment, the combination of the carriage motor 56 and the undepicted belt connecting the carriage motor 56 and the carriage 11 corresponds to the "carriage moving device" of the present teaching. Further, as depicted in FIGS. 1 and 2 and the like, the following explanation will be made with definition of the right side and the left side in the scanning direction.

The ink jet head 12 is mounted on the carriage 11 to move reciprocatingly in the scanning direction along with the carriage 11. Further, the ink jet head 12 jets inks from a plurality of nozzles 10 formed in an ink jet surface 12a which is its lower surface. The plurality of nozzles 10 align across a length L in a conveyance direction orthogonal to the scanning direction to form nozzle rows 9. Further, in the ink jet head 12, four of nozzle rows 9 are arranged side by side in the scanning direction. These four of nozzle rows 9 correspond to the black ink, yellow ink, cyan ink and magenta ink, respectively, in this order from the right side. Therefore, the black ink, yellow ink, cyan ink and magenta ink are jetted from the nozzles 10 of the corresponding nozzle rows 9, respectively.

Figure 5:
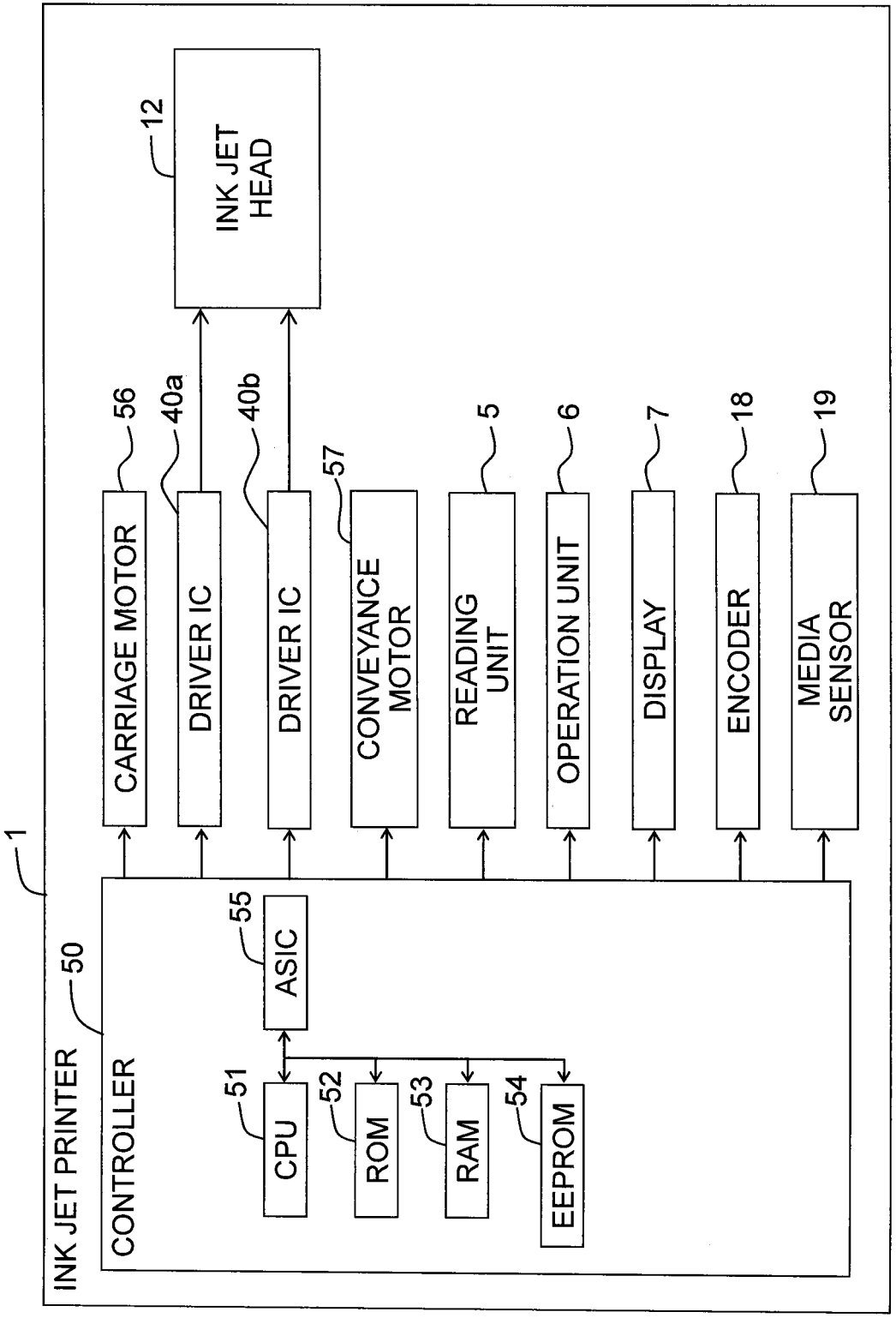
FIG. 5 is a block diagram showing an electrical configuration of the multifunction printer.

Further, the ink jet head 12 is driven by two driver ICs 40a and 40b (see FIG. 5). The driver IC 40a drives the ink jet head 12 to jet the inks from the nozzles 10 constituting a nozzle group 9a which is the upstream half of the nozzle rows 9 in the conveyance direction. The driver IC 40b drives the ink jet head 12 to jet the inks from the nozzles 10 constituting a nozzle group 9b which is the downstream half of the nozzle rows 9 in the conveyance direction. By virtue of this, in the first embodiment, between the nozzles 10 constituting the nozzle group 9a and the nozzles 10 constituting the nozzle group 9*b*, it is possible to set the ink jet-timing individually. Here, the number of the nozzles 10 constituting the nozzle group 9*a* is the same as the number of the nozzles 10 constituting the nozzle group 9*b*.

The conveyance roller 13 is arranged on the upstream side from the ink jet head 12 in the conveyance direction. The conveyance roller 13 has an upper roller 13*a* and a lower roller 13*b* and, with those rollers, nips the recording paper P fed from the feeding section 3 from the up-down direction to convey the same in the conveyance direction. The upper roller 13*a* is driven by a conveyance motor 57 (see FIG. 5). The lower roller 13*b* rotates along with the rotation of the upper roller 13*a*.

The nine corrugated plates 14 extend from a position overlapping with the conveyance roller 13 to a position on the downstream side from the conveyance roller 13 in the conveyance direction, and align at equal intervals in the scanning direction. Each of the corrugated plates 14 has a pressing portion 14*a* (the "pressing member" of the present teaching) in the end portion on the downstream side in the conveyance direction and, with the pressing portion 14*a*, presses the recording paper P from above (from the "liquid jet head side" of the present teaching). Note that the corrugated plates 14 are not necessarily aligned at equal intervals in the scanning direction. Further, the number of the corrugated plate 14 may be one.

The platen 15 is arranged to face the ink jet surface 12*a* on the downstream side of the conveyance roller 13 in the conveyance direction. The platen 15 extends in the scanning direction across the entire length of the moving range of the carriage 11 in printing. The eight ribs 20 (the "support members" of the present teaching) are formed on the upper surface of the platen 15. The eight ribs 20 extend respectively in the conveyance direction and align at equal intervals in the scanning direction to be positioned between the adjacent corrugated plates 14. Then, the ribs 20 support the recording paper P from below (from the "opposite side to the liquid jet head" of the present teaching).

Here, the upper ends of the ribs 20 are positioned above the pressing portions 14*a*. By virtue of this, the ribs 20 support from below the recording paper P at the height above the position for the pressing portions 14*a* to press the recording paper P (in the "position closer to the liquid jet head than the pressing members" of the present teaching).

The eight discharge rollers 16 are arranged on the downstream side from the ink jet head 12 in the conveyance direction. Further, the discharge rollers 16 have almost the same position as the ribs 20 in the scanning direction. Each of the discharge rollers 16 has an upper roller 16*a* and a lower roller 16*b* and, with those rollers, nips the recording paper P from the up-down direction to convey the same in the conveyance direction. Further, the discharge rollers 16 convey the recording paper P toward the discharge section 4 in the conveyance direction. The lower rollers 16*b* are driven by a conveyance motor 57 (see FIG. 5). The upper rollers 16*a* are spurs and rotate along with the rotations of the lower rollers 16*b*. The upper rollers 16*a* are in contact with the printed surface of the recording paper P after printing. However, because the upper rollers 16*a* are spurs but not rollers with a flat outer periphery, the inks on the recording paper P are less likely to adhere thereto. Further, in the first embodiment, the combination of the conveyance roller 13 and the discharge rollers 16 conveying the recording paper P corresponds to the "conveyor" of the present teaching.

The nine corrugated spurs 17 are arranged on the downstream side from the discharge rollers 16 in the conveyance direction to press the recording paper P from above. Further, the nine corrugated spurs 17 have almost the same position as the pressing portions 14*a* of the nine corrugated plates 14 in the scanning direction. Further, the nine corrugated spurs 17 are arranged below the position for the nine pressing portions 14*a* to press the recording paper P. By virtue of this, the lower rollers 16*b* of the discharge rollers 16 support the recording paper P from below at the height above the corrugated spurs 17. Further, because the corrugated spurs 17 are spurs but not rollers with a flat outer periphery, the inks on the recording paper P are less likely to adhere thereto.

Further, the numbers of the corrugated plates 14 and the discharge rollers 16, as well as the numbers of the ribs 20 and the corrugated spurs 17, are examples. Therefore, those numbers may differ from the above.

Then, the recording paper P is supported by the eight ribs 20 and the eight lower rollers 16*b*, and curved or flexed by being pressed from above by the pressing portions 14*a* of the nine corrugated plates 14 and the nine corrugated spurs 17, so as to be in a wave shape along the scanning direction as depicted in FIGS. 3A and 3B.

The encoder 18 is mounted on the carriage 11 to output a signal to the controller 50, indicating the position of the carriage 11 (the ink jet head 12) in the scanning direction. The media sensor 19 is also mounted on the carriage 11. The media sensor 19 outputs a signal to the controller 50, indicating whether or not the recording paper P is detected.

<The Controller>

Next, an explanation will be made on the controller 50 for controlling the operation of the ink jet printer 1. As depicted in FIG. 5, the controller 50 includes a CPU 51 (Central Processing Unit), a ROM 52 (Read Only Memory), a RAM 53 (Random Access Memory), an EEPROM 54 (Electrically Erasable Programmable Read Only Memory), an ASIC 55 (Application Specific Integrated Circuit), and the like.

The controller 50 controls the operations of the carriage motor 56, the driver ICs 40*a* and 40*b*, the conveyance motor 57, the reading section 5, the display 7, and the like. Further, such signals are input to the controller 50 as those corresponding to the operations on the operation section 6 and those from the encoder 18, the media sensor 19 and the like.

Here, although one CPU 51 is illustrated in FIG. 5, the controller 50 may either include a single controller 50 to carry out processes collectively with the single CPU 51 or include a plurality of CPUs 51 to carry out the processes in a shared manner with the plurality of CPUs 51. Further, although one ASIC 55 is illustrated in FIG. 5, the controller 50 may either include a single ASIC 55 to carry out processes collectively with the single ASIC 55 or include a plurality of ASICs 55 to carry out the processes in a shared manner with those plurality of ASICs 55.

<Operation in Printing>

Figure 6:
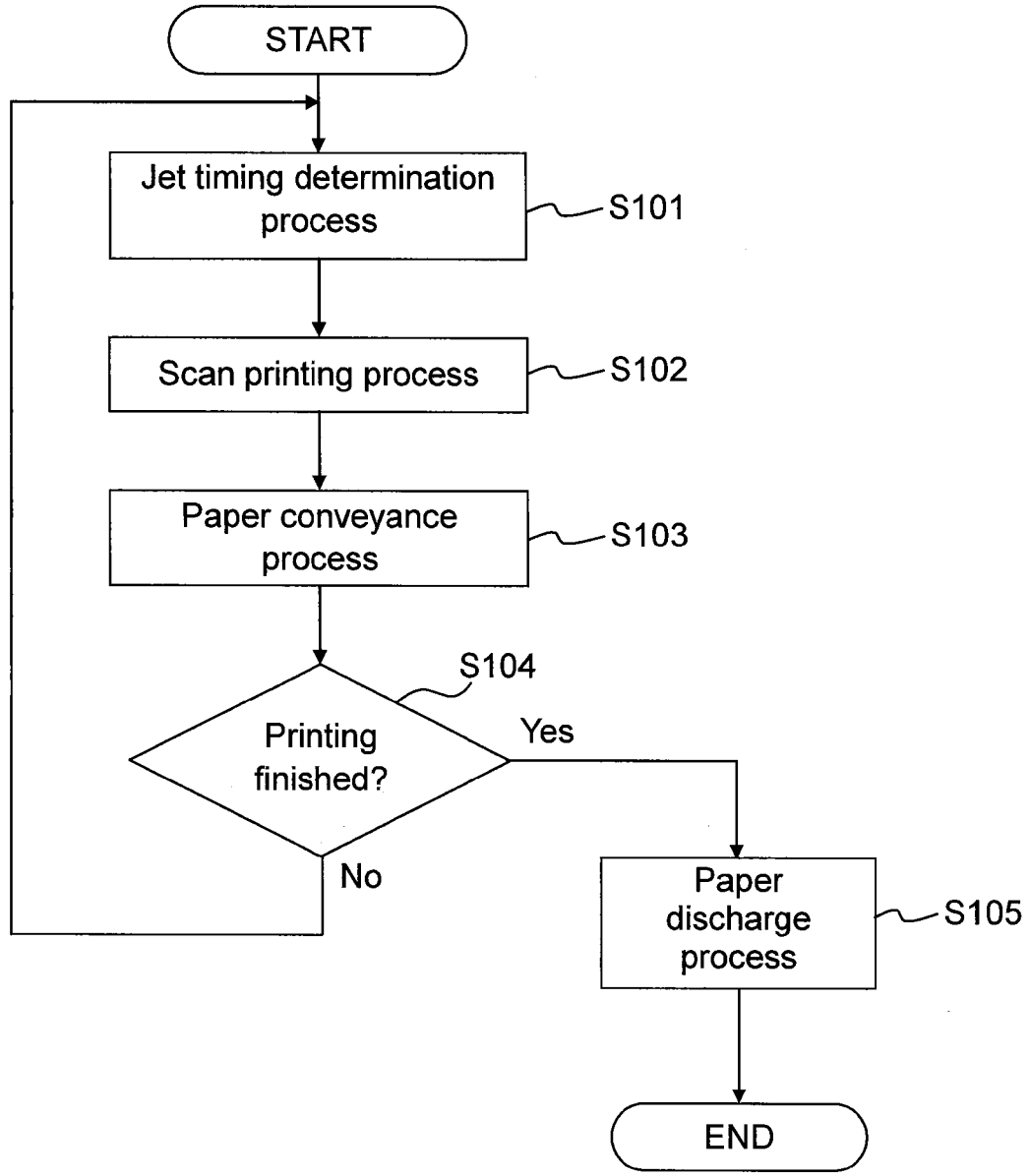
FIG. 6 is a flowchart showing a processing flow when the printer section carries out printing.

Next, an explanation will be made on the operation of the printer section 2 when carrying out printing on the recording paper P. As depicted in FIG. 6, when the printer section 2 carries out printing on the recording paper P, the controller 50 first carries out a jet-timing determination process (step S101; hereinbelow, step S101 may be simply referred to as S101). In the jet-timing determination process, the jet-timing is determined for the inks to be jetted from the plurality of nozzles 10 in a scan-printing process of step S102. The method of determining the jet-timing will be explained in detail later on.

Next, the controller 50 carries out the scan-printing process (S102). In the scan-printing process, a scan-printing is carried out to let the ink jet head 12 jet the inks from the plurality of nozzles 10 at the jet-timing determined in the jet-timing determination process of the step S101, by way of driving the carriage motor 56 to move the carriage 11 in the scanning direction while driving the driver ICs 40*a* and 40*b* based on the print data. Subsequently, the controller 50 carries out a paper conveyance process (S103). In the paper conveyance process, a paper conveyance operation is carried out to let the rollers 13 and 16 convey the recording paper P in the conveyance direction by the length L of the nozzle rows 9, by way of driving the conveyance motor 57. On this occasion, the rollers 13 and 16 transport the recording paper P such that a center 60a, in the scanning direction, of a jet area 60 of jetting the inks from the plurality of nozzles 10 in the scan-printing (the "reference position" of the present teaching) may overlap with the center of the recording paper P in the scanning direction.

Then, the processes of the step S101 to the step S103 are repeatedly carried out until the printing is finished (S104: No). When the printing is finished (S104: Yes), then the controller 50 carries out a paper discharge process (S105) and, with that, the whole process is ended. In the paper discharge process, the conveyance motor 57 is driven to let the rollers 13 and 16 discharge the recording paper P to the discharge section 4.

Then, when the printing is carried out in such a manner, the printer section 2 repeatedly carries out the scan-printing and the paper conveyance operation until the printing of images is finished.

<The Method of Determining the Jet-Timing>

Next, an explanation will be made on the method of determining the jet-timing of the inks (to be jetted) from the plurality of nozzles 10, in the jet-timing determination process of the step S101. In the step S101, the timing deviated from the reference timing by a correction time $F_1(x)$ is determined to be the jet-timing of the inks from the plurality of nozzles 10 constituting the nozzle group 9a in the scan-printing. Further, the timing deviated from the reference timing by a correction time $F_2(x)$ is determined to be the jet-timing of the inks from the plurality of nozzles 10 constituting the nozzle group 9b. Here, the reference timing is such an ink jet-timing as to land the inks on the recording paper P at predetermined intervals in the scanning direction with the recording paper P not being in the wave shape and with the inks having not yet landed on the recording paper P. Further, x indicates the position in the scanning direction; hence, x=0 at the center 60a whereby x takes a positive value on the upstream side from the center 60a and takes a negative value on the downstream side from the center 60a, with respect to the moving direction of the carriage 11 in the scan-printing.

Further, on this occasion, when the correction time $F_1(x)$ is a positive value, then the jet-timing is delayed from the reference timing by $|F_1(x)|$, whereas when the correction time $F_1(x)$ is a negative value, then the jet-timing is advanced from the reference timing by $|F_1(x)|$. In the same manner, when the correction time $F_2(x)$ is a positive value, then the jet-timing is delayed from the reference timing by $|F_2(x)|$, whereas when the correction time $F_2(x)$ is a negative value, then the jet-timing is advanced from the reference timing by $|F_2(x)|$. That is, the larger the absolute value $|F_1(x)|$ of the correction time $F_1(x)$ or the absolute value $|F_2(x)|$ of the correction time $F_2(x)$, the longer the time by which the jet-timing is deviated from the reference timing.

The correction times $F_1(x)$ and $F_2(x)$ are calculated with the following relational expressions (1) and (2), respectively.

Formula 1

$$F_1(x)=\alpha_1 \times G_{(n)}(x)+\beta_1 \times x+\sigma \quad (1)$$

$$F_2(x)=\alpha_2 \times G_{(n)}(x)+\beta_2 \times x+\sigma \quad (2)$$

When the recording paper P is in the wave shape along the scanning direction as described earlier on, then the recording paper P changes in the height (the gap between the recording paper P and the ink jet surface 12a) along the scanning direction. The term of $\alpha_1 \times G_{(n)}(x)$ of the correction time $F_1(x)$ and term of $\alpha_2 \times G_{(m)}(x)$ of the correction time $F_2(x)$ serve for correcting the position of landing the inks to correspond to the change of the gap along the scanning direction between the ink jet surface 12a and the recording paper P due to the recording paper P being in the wave shape.

The function $G_{(n)}(x)$ is a function (such as a cubic function or the like) corresponding to the change of the gap along the scanning direction between the ink jet surface 12a and the recording paper P due to the recording paper P being in the wave shape. The function $G_{(n)}(x)$ is set individually for each divided area 61 where the jet area 60 is divided into 16 equal parts, and the value of n indicates the n-th part from the left in the scanning direction. Each of the divided areas 61 has two ends at the positions where the adjacent pressing portion 14a and rib 20 are arranged in the scanning direction.

Further, in the first embodiment, there is a difference between the magnitude of the force to press the recording paper P with the pressing portions 14a and the ribs 20 arranged on the upstream side from the ink jet surface 12a in the conveyance direction, and the magnitude of the force to press the recording paper P with the discharge rollers 16 and the corrugated spurs 17 arranged on the downstream side from the ink jet surface 12a in the conveyance direction. Further, when the printer section 2 is in printing, on the recording paper P, the inks adhere to the part positioned on the downstream side from the ink jet surface 12a in the conveyance direction, whereas the inks do not adhere to the part positioned on the upstream side from the ink jet surface 12a in the conveyance direction. Therefore, on the recording paper P, the part on the downstream side from the ink jet surface 12a in the conveyance direction has a lower rigidity than the part on the upstream side. Then, due to those factors, the amplitude of the wave shape of the recording paper P differs with the position in the conveyance direction. The parameters $\alpha_1$ and $\alpha_2$ are set to correspond to the difference in the amplitude of the wave shape between the part of the recording paper P facing the nozzle group 9a and the part facing the nozzle group 9b.

Further, in the first embodiment, between a plurality of scan-printings, the parameters $\alpha_1$ and $\alpha_2$ do not change in value. However, the parameters $\alpha_1$ and $\alpha_2$ may change in value depending on the ordinal number of the scan-printing.

The $\beta_1 \times x$ term of the correction time $F_1(x)$ and the $\beta_2 \times x$ term of the correction time $F_2(x)$ serve to correct the ink landing position for the expansion/contraction of the recording paper P in the scanning direction. The recording paper P expands and/or contracts in the scanning direction along with the change in height due to being in the wave shape. Because of this, the recording paper P changes in the position of each part in the scanning direction. Further, when the inks are landed, the recording paper P swells to expand in the scanning direction. Because of this, the recording paper P changes in the position of each part in the scanning direction. On this occasion, each part of the recording paper P changes in the position along the scanning direction due to the expansion/contraction of that part of the recording paper P in the scanning direction. In addition, that part of the recording paper P also changes in the position along the scanning direction due to the expansion/contraction of the part closer to the center than that part in the scanning direction. Therefore, the farther away from the center 60a in the scanning direction, the larger the amount of expansion/contraction of the recording paper P in the scanning direction (in proportion to x).

Further, as described above, the recording paper P differs in the amplitude of the wave shape with the position in the conveyance direction. Further, as described above, on the recording paper P in printing, the part on the downstream side from the ink jet surface 12a in the conveyance direction swells because the inks are landed, whereas the part on the upstream side from the ink jet surface 12a does not swell because no inks are landed. Therefore, the recording paper P differs with the position in the conveyance direction in the degree of the expansion/contraction in the scanning direction (the length being in the wave shape in the scanning direction). The individual parameters $\beta_1$ and $\beta_2$ are set to correspond to the difference in the degree of the expansion/contraction in the scanning direction between the part of the recording paper P facing the nozzle group 9a and the part facing the nozzle group 9b.

Here, due to such factors as described above, when the recording paper P contracts as a whole in the scanning direction, then the individual parameters $\beta_1$ and $\beta_2$ are set to positive values. By virtue of this, in this case the $\beta_1 \times x$ term of the correction time $F_1(x)$ and the $\beta_2 \times x$ term of the correction time $F_2(x)$ take positive values (the values indicating the fact of delaying the jet-timing) in the upstream area on the upstream side from the center 60a in the moving direction of the carriage 11 in the scan-printing, but take negative values (the values indicating the fact of advancing the jet-timing) in the downstream area on the downstream side from the center 60a. On the other hand, when the recording paper P expands as a whole in the scanning direction, then the individual parameters $\beta_1$ and $\beta_2$ are set to negative values. By virtue of this, in this case, the $\beta_1 \times x$ term of the correction time $F_1(x)$ and the $\beta_2 \times x$ term of the correction time $F_2(x)$ take negative values (the values indicating the fact of advancing the jet-timing) in the upstream area but take positive values (the values indicating the fact of delaying the jet-timing) in the downstream area.

Further, in the first embodiment, between the scan-printings, the individual parameters $\beta_1$ and $\beta_2$ do not change in value. However, the individual parameters $\beta_1$ and $\beta_2$ may change in value depending on the ordinal number of the scan-printing. Further, in the first embodiment, the individual parameters $\beta_1$ and $\beta_2$ correspond to the "correction parameter" of the present teaching.

The parameter $\delta$ serves to correct the ink landing position for the deviation of the ink landing position which arises from other factors from the change in the amplitude of the wave shape of the recording paper P and the expansion/contraction of the recording paper P in the scanning direction. For example, the parameter $\delta$ is set to correspond to the overall change in the height of the recording paper P due to the positioning of the recording paper P in the conveyance direction, the overall change in the position of the recording paper P in the scanning direction, and the like. However, because the parameter $\delta$ is not directly related to the characteristic part of the present teaching, any detailed explanation will be omitted here.

Further, the function $G_{(n)}(x)$ and the parameters $\alpha_1$, $\alpha_2$, $\beta_1$, $\beta_2$, and $\delta$ are all set based on, for example, the result of the reading section 5 reading a predetermined printed pattern after the printer section 2 prints the pattern on the recording paper P in manufacturing the ink jet printer 1. Further, the set function $G_{(n)}(x)$ and parameters $\alpha_1$, $\alpha_2$, $\beta_1$, $\beta_2$, and $\delta$ are stored in the EEPROM 54 (the "storage section" of the present teaching).

Here, a detailed explanation will be made on what kind of value is set for the individual parameters $\beta_1$ and $\beta_2$.

Figure 7A:
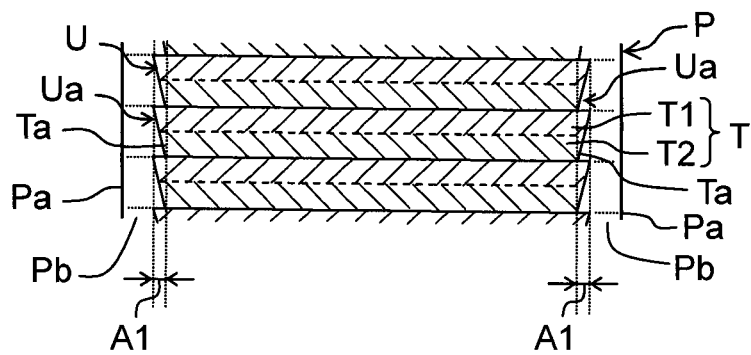
FIG. 7A depicts a printing result when the printing is carried out without varying the jet-timing between nozzle groups and/or between scan-printings.

In the first embodiment, as described above, the recording paper P differs with the position in the conveyance direction in the degree of the expansion/contraction in the scanning direction. Then, on the recording paper P, the greater the degree of the expansion/contraction in a part, the larger the change of that part in the position in the scanning direction after printing. For example, when the recording paper P contracts in printing more greatly in the scanning direction in the part on the farther upstream side in the conveyance direction, then the recording paper P expands after printing more greatly in the scanning direction in the part on the farther upstream side in the conveyance direction. As a result, when the ink jet-timing in the scan-printing is the same for all the nozzles 10 forming the nozzle rows 9, then as depicted in FIG. 7A, an edge Ta, according to the scanning direction, of an image T printed in the scan-printing is inclined with respect to the conveyance direction such that the more toward the upstream side in the conveyance direction, the more toward the outer side in the scanning direction. Hence, the deviation in the scanning direction arises between the end of the image T printed in each scan-printing on the downstream side in the conveyance direction and the end of the image T printed in the scan-printing right before the each scan-printing on the upstream side in the conveyance direction (sometimes to be referred to below as the "connecting part of the adjacent images T in the conveyance direction"). The larger the amount A1 of the deviation, the more conspicuous an end Ua of a printed image U is in being not on a straight line.

Further, when the recording paper P in printing expands more greatly in the scanning direction in a part on the farther downstream side in the conveyance direction, then the recording paper P after printing contracts more greatly in the scanning direction in the part on the farther downstream side in the conveyance direction. Hence, in this case, too, when the ink jet-timing in the scan-printing is the same for all the nozzles 10 forming the nozzle rows 9, then as described above, the deviation in the scanning direction arises in the connecting part of the adjacent images T in the conveyance direction.

On the other hand, contrary to what is described above, either when the recording paper P in printing contracts more greatly in the scanning direction in a part on the farther downstream side in the conveyance direction or when the recording paper P in printing expands more greatly in the scanning direction in a part on the farther upstream side in the conveyance direction, then when the ink jet-timing in the scan-printing is the same for all the nozzles 10 forming the nozzle rows 9, the inclination of the edge Ta of the image T printed in the scan-printing in the scanning direction is opposite to what is described above with respect to the conveyance direction.

Figure 7B:
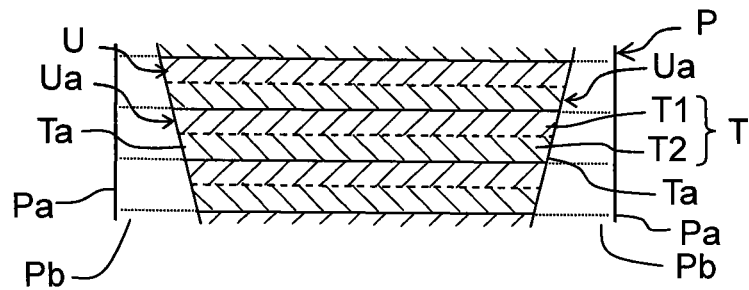
FIG. 7B depicts a printing result when an image is printed without varying the jet-timing between the nozzle groups but varying the jet-timing between the scan-printings such that the edge of the printed image may be positioned on one straight line.

Here, differently from the first embodiment, according to the inclination of the edge Ta of the image T printed in the scan-printing in the scanning direction, with respect to the conveyance direction, it is conceivable to position the end Ua of the printed image U on one straight line inclined with respect to the conveyance direction, as depicted in FIG. 7B, by varying the correction time between the scan-printings while letting the correction time remains the same as it is for all the nozzles 10 of the nozzle rows 9, so as to eliminate the deviation of the connecting part of the adjacent images T. However, when the edge Ta of the image T in the scanning direction is inclined with respect to the conveyance direction such that the more toward the upstream side in the conveyance direction, the more toward the outer side in the scanning direction, then it is necessary to print the image T on the downstream side in the conveyance direction (the image T printed in the previous scan-printing) closer to the center in the scanning direction. Therefore, the more toward the downstream side in the conveyance direction, the longer a margin Pb between the edge Pa of the recording paper P in the scanning direction and the end Ua of the printed image U in the scanning direction. As a result, the difference becomes more conspicuous in the length of the margin Pb between the edge Pa of the recording paper P in the scanning direction and the end Ua of the printed image U in the scanning direction, due to the position in the conveyance direction.

In the same manner, when the edge Ta of the image T in the scanning direction is inclined with respect to the conveyance direction such that the more toward the downstream side in the conveyance direction, the more toward the outer side in the scanning direction, then it is necessary to print the image T on the upstream side in the conveyance direction (the image T printed in the succeeding scan-printing) closer to the center in the scanning direction. Therefore, the more toward the upstream side in the conveyance direction, the longer the margin Pb between the edge Pa of the recording paper P in the scanning direction and the end Ua of the printed image U in the scanning direction. As a result, the difference becomes more conspicuous in the length of the margin Pb between the edge Pa of the recording paper P in the scanning direction and the end Ua of the printed image U in the scanning direction, due to the position in the conveyance direction.

Figure 7C:
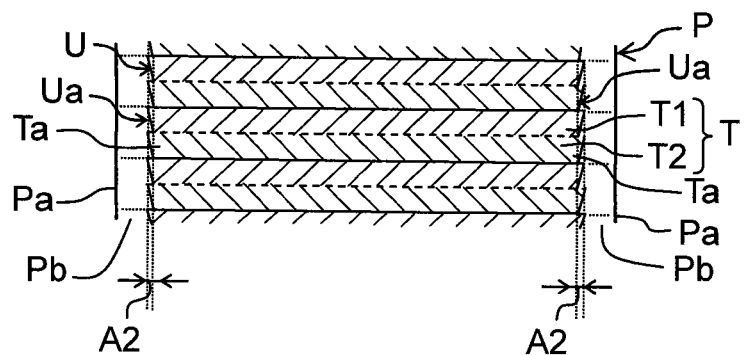
FIG. 7C depicts a printing result of a first embodiment.

Therefore, in the first embodiment, as described above, the individual parameters $\beta_1$ and $\beta_2$ are set individually for the nozzle groups 9a and 9b to let the individual parameter $\beta_1$ differ in value from the individual parameter $\beta_2$. In particular, as depicted in FIG. 7C, the values of the individual parameters $\beta_1$ and $\beta_2$ are set such that after printing, with the recording paper P being no longer in the wave shape, in the image T printed in the scan-printing, the landing position of the inks, in the scanning direction, jetted from the nozzles 10 of the nozzle group 9a on the most upstream side in the conveyance direction may be the same as the landing position of the inks, in the scanning direction, jetted from the nozzles 10 of the nozzle group 9b on the most upstream side in the conveyance direction. Further, in the first embodiment, as described above, the number of the nozzles 10 constituting the nozzle group 9a is the same as the number of the nozzles 10 constituting the nozzle group 9b. Therefore, when the values of the individual parameters $\beta_1$ and $\beta_2$ are set in this manner, then the landing position of the inks, in the scanning direction, jetted from the nozzles 10 of the nozzle group 9a on the most downstream side in the conveyance direction becomes the same as the landing position of the inks, in the scanning direction, jetted from the nozzles 10 of the nozzle group 9b on the most downstream side in the conveyance direction.

Then, in this case, in the image T printed in the scan-printing, deviation in the scanning direction arises between the edge, on the downstream side in the conveyance direction, of a part T1 printed with the inks jetted from the nozzles 10 constituting the nozzle group 9a and the edge, on the upstream side in the conveyance direction, of a part T2 printed with the inks jetted from the nozzles 10 constituting the nozzle group 9b (sometimes to be referred to below as at the "connecting part between the part T1 and the part T2"), as well as in the connecting part of adjacent images T in the conveyance direction. However, since an amount A2 of such deviation is smaller than the abovementioned amount A1 of the deviation in the case of FIG. 7A (about half of the amount A1), the end Ua of the printed image U in the scanning direction is less likely to be conspicuous. Further, in this case, since the parts T1 of all scan-printings have the same position in the scanning direction, the parts T2 of all scan-printings also have the same position in the scanning direction. Therefore, in this case, it is possible to reduce the variation, due to the position in the conveyance direction, in the length of the margin Pb between the edge Pa of the recording paper P in the scanning direction and the end Ua of the printed image U in the scanning direction.

Second Embodiment

Next, a second embodiment of the present teaching will be explained.

In the second embodiment, the correction times $F_{1(m)}(x)$ and $F_{2(m)}(x)$ for the nozzle group 9a are calculated with the following relational expressions (3) and (4), respectively. That is, the correction times $F_{1(m)}(x)$ and $F_{2(m)}(x)$ of the second embodiment are such that $\gamma_{(m)} \times x$ is added to the correction times $F_1(x)$ and $F_2(x)$ of the first embodiment. Here, m is a natural number indicating the m-th scan-printing. Further, in the second embodiment, the individual parameters $\beta_1$ and $\beta_2$ are individual parameters for the nozzle groups 9a and 9b while the common parameter $\gamma_{(m)}$ is the common parameter for the nozzle groups 9a and 9b, set for each of the plurality of scan-printings. Further, in the second embodiment, the parameter $[\beta_1 + \gamma_{(m)}]$ of adding the individual parameter $\beta_1$ and the common parameter $\gamma_{(m)}$ and the parameter $[\beta_2 + \gamma_{(m)}]$ of adding the individual parameter $\beta_2$ and the common parameter $\gamma_{(m)}$ correspond to the "correction parameter" of the present teaching.

[Formula 2]

$$F_1(x) = \alpha_1 \times G_{(n)}(x) + (\beta_1 + \gamma_{(m)}) \times x + \sigma \tag{3}$$

$$F_2(x) = \alpha_2 \times G_{(n)}(x) + (\beta_2 + \gamma_{(m)}) \times x + \sigma \tag{4}$$

In the second embodiment, the function $G_{(n)}(x)$ and the parameters $\alpha_1$, $\alpha_2$, $\beta_1$, $\beta_2$, $\gamma_{(m)}$, and $\delta$ are set in manufacturing the ink jet printer 1. Because the function $G_{(n)}(x)$ and the parameters $\alpha_1$, $\alpha_2$, and $\delta$ are the same as those in the first embodiment, explanation will be omitted here.

In the second embodiment, too, as in the first embodiment, it is possible to individually set the individual parameter $\beta_1$ and $\beta_2$ for the nozzle group 9a and the nozzle group 9b. Further, in the second embodiment, it is possible to set the common parameter $\gamma_{(m)}$ common to the nozzle group 9a and the nozzle group 9b for each of the plurality of scan-printings. Then, in the second embodiment, printing is carried out either in a first print mode or in a second print mode according to an aftermentioned property and the like of the ink jet printer 1.

The first print mode serves to determine the jet-timing, as in the first embodiment, by using the correction times $F_{1(m)}(x)$ and $F_{2(m)}(x)$ where the individual parameters $\beta_1$ and $\beta_2$ are set to some values while the common parameter $\gamma_{(m)}$ is all set to zero for every scan-printing. That is, the first print mode serves to determine the jet-timing using the individual parameters but not using the common parameter. The second print mode serves to determine the jet-timing by using the correction times $F_{1(m)}(x)$ and $F_{2(m)}(x)$ where the individual parameters $\beta_1$ and $\beta_2$ are set individually while the common parameter $\gamma_{(m)}$ is set to a different value between the scan-printings. That is, the second print mode serves to determine the jet-timing using both the individual parameters and the common parameter.

When printing is carried out in the first print mode, then the correction times $F_{1(m)}(x)$ and $F_{2(m)}(x)$ have the same values as the correction times $F_1(x)$ and $F_2(x)$ of the first embodiment. Therefore, in this case, as in the first embodiment, the deviation in the scanning direction arises in the connecting part between the part T1 and the part T2 of the images T printed in the scan-printings as well as in the connecting part of the adjacent images T in the conveyance direction. Then, when the amount A2 of those deviations is equal to or less than a predetermined deviation amount, then the values of the parameters $\beta_1$, $\beta_2$ and $\gamma_{(m)}$ are set and stored in the EEPROM 54 so as to carry out the printing in the first print mode. Here, the predetermined deviation amount is, for example, deviation of one pixel of a printed image at a certain resolution (such as 1/600 inch when the resolution is 600 dpi). In this case, when the deviation amount A2 is equal to or less than the predetermined amount, then the difference between the parameters $\beta_1$ and $\beta_2$ is not more than a predetermined value corresponding to one pixel of the printed image at the resolution.

Figure 8A:
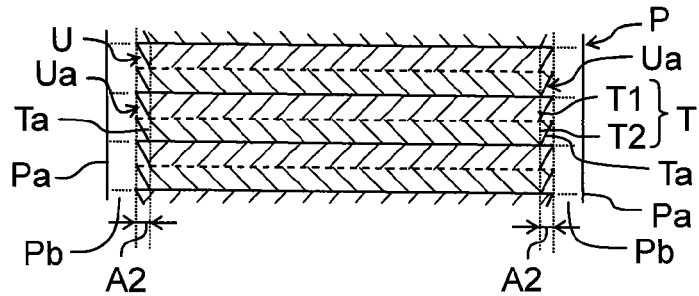
FIG. 8A depicts an example, different from FIG. 7C, of the image printed when a correction time is determined using individual parameters $\beta_1$ and $\beta_2$ with the common parameter $\gamma(m)=0$, according to a second embodiment.

On the other hand, as depicted in FIG. 8A for example, when printing is carried out in the first print mode, when the abovementioned deviation amount A2 is larger than that in FIG. 7C and exceeds the predetermined amount, then the values of the parameters $\beta_1$, $\beta_2$ and $\gamma_{(m)}$ are set and stored in the EEPROM 54 so as to carry out the printing in the second print mode. In this case, the individual parameters $\beta_1$ and $\beta_2$ are set such that the difference between the individual parameters $\beta_1$ and $\beta_2$ may be not more than the above predetermined value. Further, either when the recording paper P contracts more greatly in the scanning direction in the part on the farther upstream side in the conveyance direction or when the recording paper P expands more greatly in the scanning direction in the part on the farther downstream side in the conveyance direction, then the value of the common parameter $\gamma_{(m)}$ is set to satisfy a magnitude relationship for the common parameter $\gamma_{(1)} < \gamma_{(2)} < \gamma_{(3)} < \ldots$. Further, the value of the common parameter $\gamma_{(m)}$ is also set to let $|\gamma_{(m+1)} - \gamma_{(m)}|$, the difference between the common parameters $\gamma_{(m+1)}$ and $\gamma_{(m)}$, be not more than the above predetermined value. On the other hand, either when the recording paper P contracts more greatly in the scanning direction in the part on the farther downstream side in the conveyance direction or when the recording paper P expands more greatly in the scanning direction in the part on the farther upstream side in the conveyance direction, then the value of the common parameter $\gamma_{(m)}$ is set to satisfy a magnitude relationship for the common parameter $\gamma_{(1)} > \gamma_{(2)} > \gamma_{(3)} > \ldots$, and is set to let $|\gamma_{(m+1)} - \gamma_{(m)}|$, the difference between the common parameters $\gamma_{(m+1)}$ and $\gamma_{(m)}$, be not more than the above predetermined value.

Figure 8B:
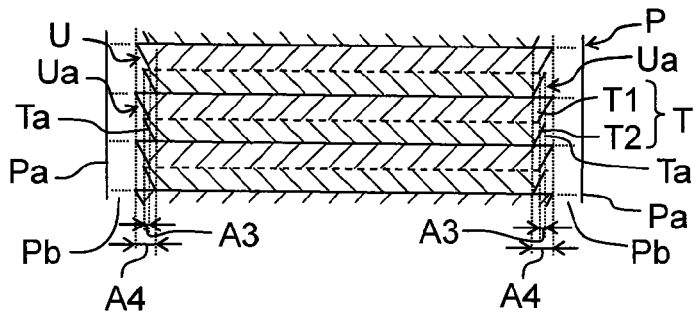
FIG. 8B depicts an image when decreasing the difference between the individual parameters $\beta_1$ and $\beta_2$ for FIG. 8A.
Figure 8C:
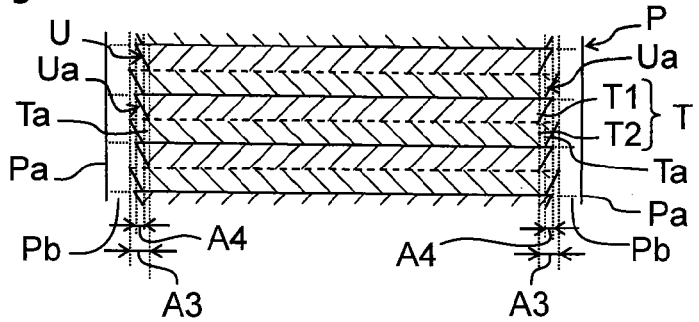
FIG. 8C depicts an image when increasing the difference between the individual parameters $\beta_1$ and $\beta_2$ for FIG. 8A.

Here, when the values of the individual parameters $\beta_1$ and $\beta_2$ are set such that the difference between $\beta_1$ and $\beta_2$ may be larger than that in FIG. 8A with the common parameter $\gamma_{(m)}=0$ as it is, then as depicted in FIG. 8B, it is possible to reduce an amount A3 of deviation in the scanning direction in the connecting part between the part T1 and the part T2 of each image T, but an amount A4 of deviation in the scanning direction increases in the connecting part between the adjacent images T in the conveyance direction. On the other hand, when the values of the individual parameters $\beta_1$ and $\beta_2$ are set such that the difference between $\beta_1$ and $\beta_2$ may be smaller than that in FIG. 8A with the common parameter $\gamma_{(m)}=0$ as it is, then as depicted in FIG. 8C, it is possible to reduce the deviation amount A3, but the deviation amount A4 increases.

Hence, in the second embodiment, when the printing is carried out in the first print mode, and when the deviation amount A2 exceeds the predetermined deviation amount, it is configured to carry out the printing in the second print mode. That is, the values of the individual parameters $\beta_1$ and $\beta_2$ are set individually for the nozzle groups 9a and 9b such that the difference therebetween may be not more than the predetermined value. Further, the common parameter $\gamma_{(m)}$ common to the nozzle groups 9a and 9b is set such that $|\gamma_{(m+1)} - \gamma_{(m)}|$, the difference between the common parameters $\gamma_{(m+1)}$ and $\gamma_{(m)}$, may be not more than the predetermined value.

Figure 8D:
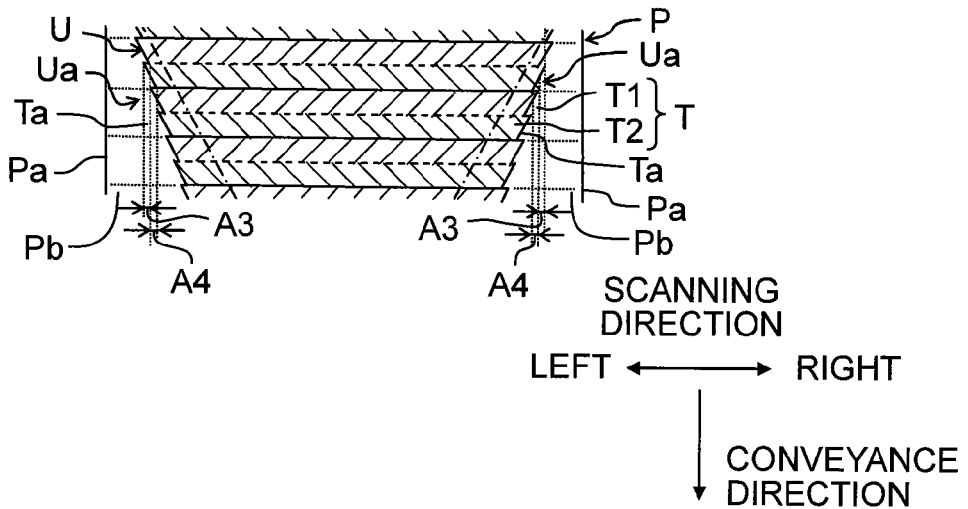
FIG. 8D depicts an image when determining the correction time using both the individual parameters $\beta_1$ and $\beta_2$ and the common parameter $\gamma(m)$ with the values varied between the scan-printings.

Then, when the printing is carried out in the second print mode, then as depicted in FIG. 8D, because the difference between the individual parameters $\beta_1$ and $\beta_2$ is small, the deviation amount A3 becomes small. Further, because $|\gamma_{(m+1)} - \gamma_{(m)}|$ is small, the deviation amount A4 becomes small.

As is understood from comparing FIG. 8A with FIG. 8D, when the printing is carried out in the second print mode, compared with the case of printing in the first print mode, there is a larger variation in the length of the margin Pb between the edge Pa of the recording paper P and the end Ua of the printed image U in the scanning direction. However, by setting the individual parameters $\beta_1$ and $\beta_2$ to zero and setting the parameter $\gamma_{(m)}$ for each scan-printing while letting the deviation amount A3=0, compared with the case of reducing the deviation amount A4 (for example, the case indicated with the one-dot chain line in FIG. 8D), it is possible to reduce the variation in the length of the margin Pb between the edge Pa of the recording paper P and the end Ua of the printed image U in the scanning direction.

In this manner, in the second embodiment, it is possible to carry out printing either in the first print mode or in the second print mode. Next, different usage of those print modes will be explained.

For example, among individual ink jet printers 1, more or less variation will arise in the force for the pressing portions 14a and ribs 20, as well as the discharge rollers 16 and corrugated spurs 17, to press the recording paper P. Hence, among individual ink jet printers 1, there is variation in the difference of the degree of expansion/contraction of the recording paper P in the scanning direction between the part facing the nozzle group 9a and the part facing the nozzle group 9b. In particular, the larger the difference between the force for the corrugated plates 14 and ribs 20 to press the recording paper P and the force for the discharge rollers 16 and corrugated spurs 17 to press the recording paper P, the larger the difference of the degree of the expansion/contraction of the recording paper P in the scanning direction between the part facing the nozzle group 9a and the part facing the nozzle group 9b.

Thus, for example, when the difference is not so large between the force for the corrugated plates 14 and ribs 20 to press the recording paper P and the force for the discharge rollers 16 and corrugated spurs 17 to press the recording paper P, then with such ink jet printers 1 as even when the printing is carried out in the first print mode, the deviation amount A2 is still not more than the predetermined deviation amount, the values of the parameters $\beta_1$, $\beta_2$ and $\gamma_{(m)}$ are set to carry out printing in the first print mode. On the other hand, with such ink jet printers 1 as when the printing is carried out in the first print mode at a large difference in the force to press the recording paper P, then the deviation amount A2 exceeds the predetermined deviation amount, the values of the parameters $\beta_1$, $\beta_2$ and $\gamma_{(m)}$ are set to carry out printing in the second print mode.

Alternatively, with the type of the recording paper P used in the printing, there may also be variation in the difference of the degree of expansion/contraction of the recording paper P in the scanning direction between the part facing the nozzle group 9a and the part facing the nozzle group 9b. In particular, the lower the rigidity of the recording paper P or the easier it is for the recording paper P to absorb the inks, the larger the difference of the degree of the expansion/contraction in the scanning direction between the part facing the nozzle group 9a and the part facing the nozzle group 9b. Therefore, for example, in manufacturing the ink jet printers 1, the parameters $\alpha_1$, $\alpha_2$, $\beta_1$, $\beta_2$, $\gamma_{(m)}$ and $\delta$ are set for each type of the recording paper P. Then, on this occasion, on the recording paper P where the difference is small in the degree of the expansion/contraction of the recording paper P and, even when the printing is carried out in the first print mode, the deviation amount A2 is still not more than the predetermined deviation amount, the values of the parameters $\beta_1$, $\beta_2$ and $\gamma_{(m)}$ are set to carry out the printing in the first print mode. On the other hand, on the recording paper P where the difference is larger in the degree of the expansion/contraction and, when the printing is carried out in the first print mode, then the deviation amount A2 exceeds the predetermined deviation amount, the values of the parameters $\beta_1$, $\beta_2$ and $\gamma_{(m)}$ are set to carry out the printing in the second print mode.

Further, in the second embodiment, too, in manufacturing the ink jet printer 1, the function $G_{(n)}(x)$ and the values of the parameters $\alpha_1$, $\alpha_2$, $\beta_1$, $\beta_2$, $\gamma_{(m)}$ and $\delta$ are set based on, for example, the result of the reading section 5 reading a predetermined printed pattern after the printer section 2 prints the pattern on the recording paper P, and then stored in the EEPROM 54.

Further, the different usage of printing in the first print mode and printing in the second print mode is not limited to the above two examples. According to the property and the like of other ink jet printers 1 than those two, such different usage may also apply to the printing either in the first print mode or in the second print mode.

Third Embodiment

Next, a third embodiment of the present teaching will be explained. In the third embodiment, as in the first and second embodiments, the individual parameter $\beta_1$ is set in manufacturing the ink jet printer 1. On the other hand, in the third embodiment, the individual parameter $\beta_{2(m)}$ is determined for each scan-printing according to print data. Further, the individual parameter $\beta_{2(m)}$ refers to the value of the individual parameter $\beta_2$ for the m-th scan-printing.

Figure 9:
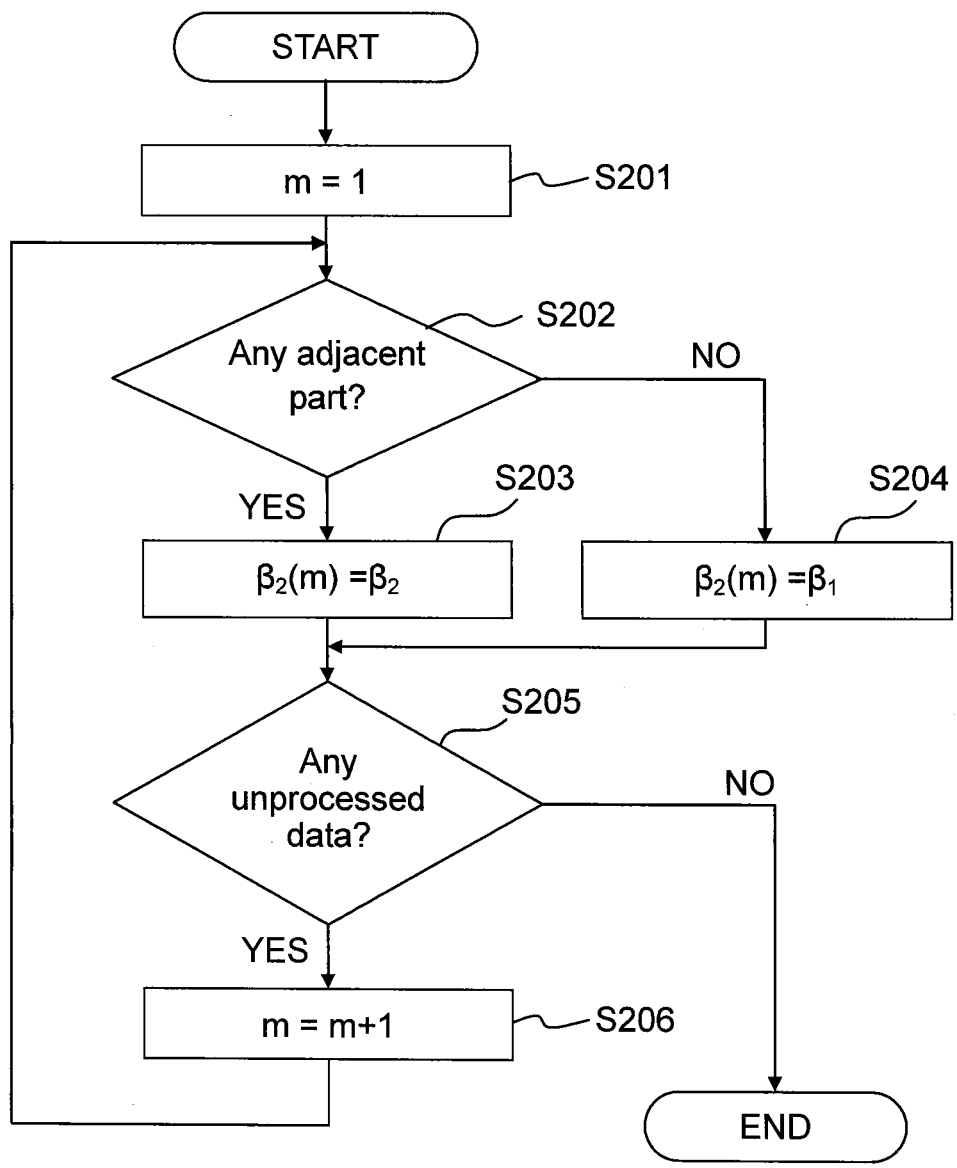
FIG. 9 is a flowchart showing a procedure of determining the individual parameter $\beta_{2(m)}$ based on print data according to a third embodiment.
Figure 10A:
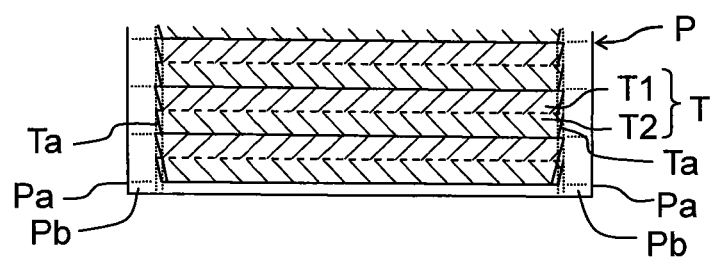
FIG. 10A is a view of such a part of a printed image as including the image printed in the initial scan-printing.
Figure 10B:
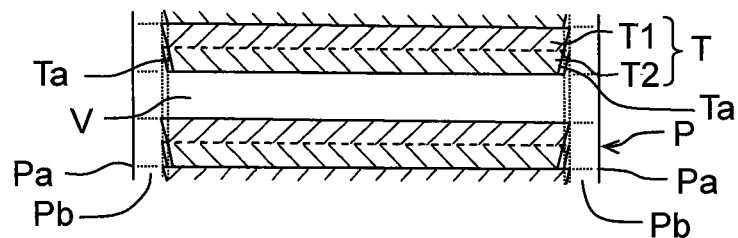
FIG. 10B is a view of such a part of the printed image as including a blank part.

In the third embodiment, the controller 50 determines the individual parameter $\beta_{2(m)}$ by carrying out the process following the flow of FIG. 9. That is, the controller 50 first sets the value of m to 1 (S201). Next, the controller 50 determines whether or not there is an adjacent part between the part T2 of the image T printed in the m-th scan-printing and the part T1 of the image T printed in the (m−1)th scan-printing (S202; the "determination process" of the present teaching). Here, when the above adjacent part is present, then the image T printed in the m-th scan-printing aligns adjacently in the conveyance direction with the image T printed in the (m−1)-th scan-printing. On the other hand, when the above adjacent part is absent, then for example, as depicted in FIG. 10A where m=1 (the (m−1)-th scan-printing is absent), and as depicted in FIG. 10B where there is a blank part V without any printed image between the image T printed in the m-th scan-printing and the image T printed in the (m−1)-th scan-printing. Further, when the above blank part V is present, then the transport distance of the recording paper P is longer than the length L of the nozzle rows 9 in the paper conveyance operation after the (m−1)-th scan-printing but before the m-th scan-printing.

Then, when the above adjacent part is present (S202: Yes), then the value of the individual parameter $\beta_{2(m)}$ for the m-th scan-printing is set to the same value as the individual parameter $\beta_2$ in the first embodiment (the value different from the individual parameter $\beta_1$) (S203). By virtue of this, in the same manner as explained in the first embodiment, in the image T printed in the m-th scan-printing, the deviation amount between the part T1 and the part T2 is A2 of the deviation in the scanning direction. Further, the deviation amount between the part T2 of the image T printed in the m-th scan-printing and the part T1 of the image T printed in the (m−1)th scan-printing is also A2.

On the other hand, when the above adjacent part is absent (S202: No), then the value of the individual parameter $\beta_{2(m)}$ for the m-th scan-printing is set to the same value as the individual parameter $\beta_1$ in the first embodiment (S204). In this case, as depicted in FIGS. 10A and 10B, there is no deviation in the scanning direction between the part T1 of the image T and the part T2 printed in the m-th scan-printing.

Further, in the third embodiment, the combination of the processes of the step S230 and step S204 corresponds to the "parameter determination process" of the present teaching.

Here, in the first embodiment, in order to reduce the deviation in the scanning direction in the connecting part of the adjacent images T in the conveyance direction, the individual parameters $\beta_1$ and $\beta_2$ are set to different values to deviate the connecting part in the scanning direction between the parts T1 and T2 of the image T printed in the scan-printing. When the adjacent part is absent on the downstream side in the conveyance direction in the images printed in the scan-printings, then it is not necessary to set the individual parameters $\beta_1$ and $\beta_2$ to different values so as to deviate the connecting part in the scanning direction between the parts T1 and T2 of the image T. Further, when the connecting part between the parts T1 and T2 of the image T is needlessly deviated, then the printed image U may result in a low image quality.

Hence, in the third embodiment, as described above, when the adjacent part is absent, the value of the individual parameter $\beta_{2(m)}$ for the m-th scan-printing is set to the same value as the individual parameter $\beta_1$ to have no deviation in the scanning direction in the connecting part between the part T1 and the part T2 of the image T printed in the m-th scan-printing. By virtue of this, in the scan-printings, it is possible to constantly realize a higher quality of the printed image U than the case of varying the individual parameter $\beta_1$ and the individual parameter $\beta_2$.

Here, when print data are input to the ink jet printer 1, the data may be input in order from the print data of the previous scan-printing. In this case, at the stage of inputting the print data of the m-th scan-printing, the print data of the (m−1)th scan-printing has already been input. In the third embodiment, the value of the individual parameter $\beta_1$ is preset for the nozzle group 9a, and then the value of the individual parameter $\beta_{2(m)}$ is determined for the nozzle group 9b according to the print data. By virtue of this, when the print data is input for the m-th scan-printing, it is possible to immediately carry out the determination of the step S202.

On the other hand, contrary to the third embodiment, it is conceivable to preset the value of the individual parameter $\beta_2$ for the nozzle group 9b to determine the value of the individual parameter $\beta_{1(m)}$ for the nozzle group 9a according to the print data. In this case, in S202, it is determined whether or not there is an adjacent part in the conveyance direction between the part T1 of the image T printed in the m-th scan-printing and the part T2 of the image T printed in the (m+1)-th scan-printing. However, at the stage of inputting the print data for the m-th scan-printing, the print data for the (m+1)-th scan-printing has not yet been input. Therefore, in this case, after the print data for the m-th scan-printing is input and, further, when the print data for the (m+1)-th scan-printing is not input, it is not possible to carry out the determination of the step S202.

Therefore, as in the third embodiment, when the value of the individual parameter $\beta_1$ is preset for the nozzle group 9a and then the value of the individual parameter $\beta_{2(m)}$ is determined for the nozzle group 9b according to the print data, it is possible to carry out the process for determining the individual parameter more effectively than the case of, contrary to the third embodiment, presetting the value of the individual parameter $\beta_2$ for the nozzle group 9b and then determining the value of the individual parameter $\beta_{1(m)}$ for the nozzle group 9a according to the print data.

Next, explanations will be made on a few modifications which apply various changes to the first to third embodiments.

In the first embodiment, the individual parameters $\beta_1$ and $\beta_2$ are set individually for the nozzle groups 9a and 9b and the values of the individual parameters $\beta_1$ and $\beta_2$ are varied, so as to cause deviation in the scanning direction between the part T1 and the part T2 of the image T printed in the scan-printing. However, without being limited to this, in a first modification, the correction time $F_1(x)$ for the nozzle group 9a is calculated with the following relational expression (5) while the correction time $F_2(x)$ for the nozzle group 9b is calculated with the following relational expression (6). That is, between the nozzle groups 9a and 9b, the individual parameters $\beta_1$ is set only for the nozzle group 9a while the common parameter $\gamma$ is set commonly for the nozzle groups 9a and 9b. Here, the common parameter $\gamma$ may either be common to a plurality of scan-printings or be set for each scan-printing just as the common parameter $\gamma_{(m)}$ in the second embodiment.

[Formula 3]

$$F_1(x) = \alpha_1 \times G_{(m)}(x)(\beta_1 + \gamma) \times x + \sigma \quad (5)$$

$$F_2(x) = \alpha_2 \times G_{(m)}(x) + \gamma 4 \times x + \sigma \quad (6)$$

In the first modification, due to the individual parameter $\beta_1$, the deviation in the scanning direction arises between the part T1 and the part T2 of the image T printed in the scan-printing. Further, although the individual parameter $\beta_1$ is set for the nozzle group 9a in the first modification, the individual parameter $\beta_2$ may be set for the nozzle group 9b instead of setting the individual parameter $\beta_1$ for the nozzle group 9a.

In the same manner, in the second embodiment, between the nozzle groups 9a and 9b, either the individual parameter $\beta_1$ may be set individually only for the nozzle group 9a or the individual parameter $\beta_2$ may be set individually only for the nozzle group 9b.

Further, in the third embodiment, the value of the individual parameter $\beta_1$ is preset for the nozzle group 9a to determine the value of the individual parameter $\beta_{2(m)}$ for the nozzle group 9b according to the print data. However, without being limited to this, contrary to the third embodiment for example, the value of the individual parameter $\beta_2$ may be preset for the nozzle group 9b to determine the individual parameter $\beta_{1(m)}$ for the nozzle group 9a according to the print data. Alternatively, the value of the individual parameter $\beta_{1(m)}$ for the nozzle group 9a and the value of the individual parameter $\beta_{2(m)}$ for the nozzle group 9b may be determined respectively according to the print data.

Further, in the first to third embodiments, the nozzle rows 9 are divided into the two nozzle groups 9a and 9b aligning in the conveyance direction, and the individual parameters $\beta_1$ and $\beta_2$ are set individually for the nozzle groups 9a and 9b. However, without being limited to this, the nozzle rows 9 may be divided into three or more nozzle groups aligning in the conveyance direction, and the individual parameter may be set individually for each nozzle group. On this occasion, each nozzle group may either be formed from one nozzle 10 or be formed from two or more nozzles 10 aligning in the conveyance direction.

Further, when the nozzle rows 9 are divided into three or more nozzle groups, then the value of a correction parameter is set for each nozzle group such that the correction parameters may differ in value between two or more nozzle groups among the plurality of nozzle groups. For example, individual parameters are set for two or more nozzle groups and, between the two or more nozzle groups among the nozzle groups where the individual parameters are set, the individual parameters differ in value. Alternatively, for example, the individual parameters $\beta$ are set for some nozzle groups while the common parameter $\gamma$ is set for all nozzle groups. In this case, the value of the correction parameter ($=\beta+\gamma$) for the nozzle groups where the individual parameters are set is different from the value of the correction parameter ($=\gamma$) for the nozzle groups where only the common parameter is set.

Further, in the third embodiment, when the nozzle rows 9 are divided into three or more nozzle groups, then for example, with respect to those divided nozzle groups, the values of the individual parameters for the nozzle groups on the most downstream side in the conveyance direction may be determined according to the print data, while the values of the individual parameters for the other nozzle groups may be preset. Then, in S202, it is determined whether or not there is an adjacent part in the conveyance direction between the part, of the image T printed in the m-th scan-printing, printed by the inks jetted from the nozzles 10 constituting the nozzle groups on the most downstream side in the conveyance direction, and the part, of the image T printed in the (m−1)-th scan-printing, printed by the inks jetted from the nozzles 10 constituting the nozzle groups on the most upstream side in the conveyance direction. Then, when the adjacent part is present, then the values of the individual parameters for the nozzle groups on the most downstream side in the conveyance direction in the m-th scan-printing is set to values different from the values of the individual parameters for the nozzle groups on the most upstream side in the conveyance direction in the (m−1)-th scan-printing. On the other hand, when the adjacent part is absent, then the values of the individual parameters for the nozzle groups on the most downstream side in the conveyance direction in the m-th scan-printing is set to the same as the values of the individual parameters for the second nozzle group from the downstream side in the conveyance direction in the m-th scan-printing.

Further, in the first to third embodiments, the number of the nozzles 10 constituting the nozzle group 9a is the same as the number of the nozzles 10 constituting the nozzle group 9b. However, without being limited to this, the number of the nozzles 10 constituting the nozzle group 9a may differ from the number of the nozzles 10 constituting the nozzle group 9b. Much the same is true on the case of dividing the nozzle rows 9 into three or more nozzle groups.

Figure 11A:
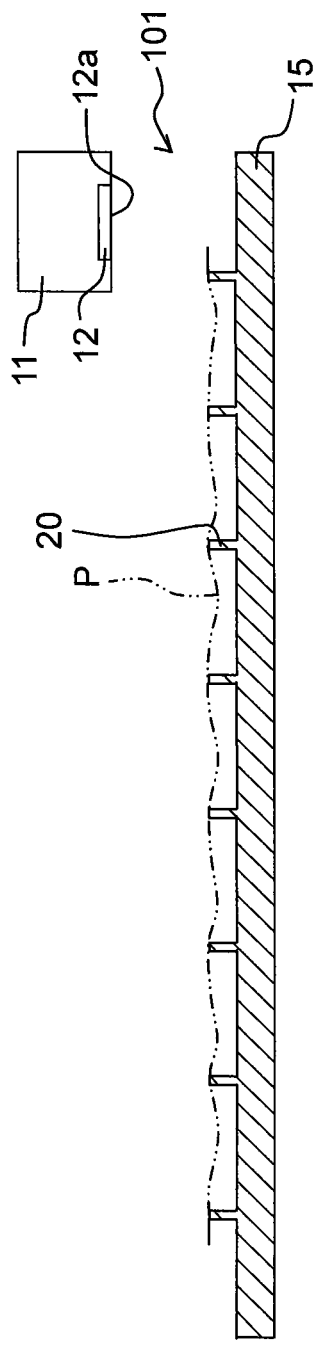
FIG. 11A corresponds to FIG. 3A according to a second modification.
Figure 11B:
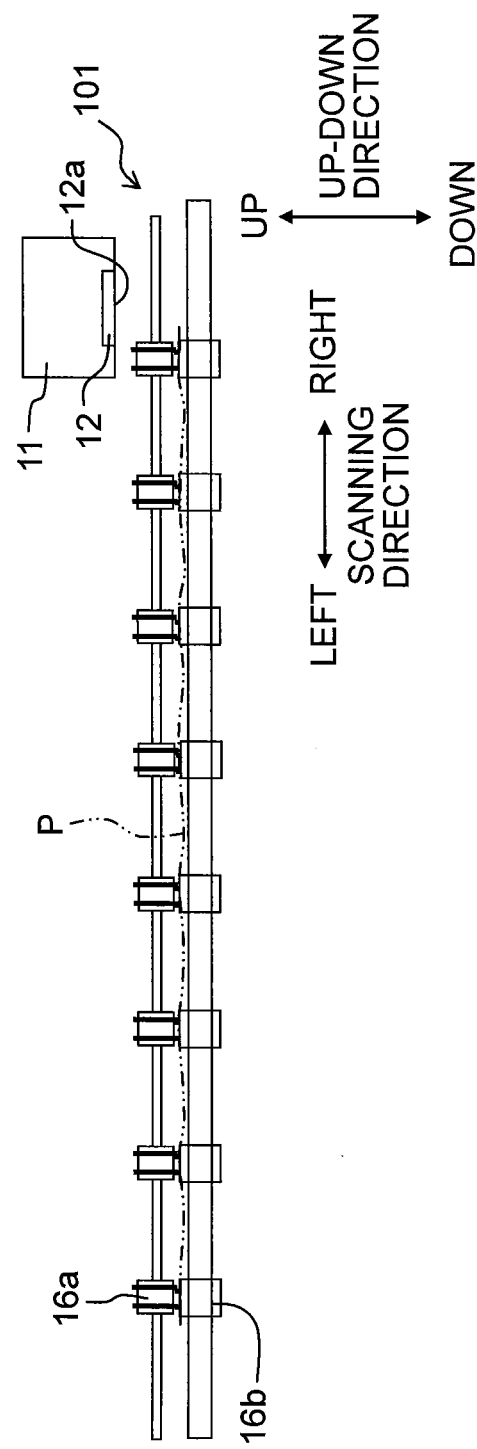
FIG. 11B corresponds to FIG. 3B according to the second modification.

Further, in the first to third embodiments, the recording paper P is curved in the wave shape along the scanning direction. However, without being limited to this, in a second modification as depicted in FIGS. 11A and 11B, a printer section 101 does not include the corrugated plates 14 and the corrugated spurs 17 (see FIGS. 3A and 3B). Then, the recording paper P is supported from below by the eight ribs 20 and the lower rollers 16b of the eight discharge rollers 16. Further, in FIG. 12, for the sake of convenience, illustration of the conveyance roller 13 depicted in FIG. 3A is omitted. In the course of printing, on the recording paper P, the inks are landed on the downstream side of the ink jet head 12, whereas the inks are not landed on the upstream side of the ink jet head 12. Therefore, a difference arises in the rigidity of the recording paper P between the upstream side and the downstream side of the ink jet head 12. Hence, the correction parameter may be set according to the difference of the degree of the expansion/contraction of the recording paper P in the scanning direction between the part facing the nozzle group 9a and the part facing the nozzle group 9b. Further, when the corrugated plates 14 and the corrugated spurs 17 are included, compared with the case of not including the corrugated plates 14 and the corrugated spurs 17, the difference is more conspicuously depicted in the degree of the expansion/contraction of the recording paper P in the scanning direction between the part facing the nozzle group 9a and the part facing the nozzle group 9b.

Further, in a third modification as depicted in FIG. 12, a printer section 111 includes nine pressing members 112 on the upstream side from the ink jet head 12 in the conveyance direction, in addition to the same configuration as the printer section 101 of the second modification. The nine pressing members 112 are arranged, in the scanning direction, between the adjacent ribs 20, on the right side of the rightmost rib 20, and on the left side of the leftmost rib 20. The lower ends of the pressing members 112 are positioned either as high as the upper ends of the ribs 20 or above the upper ends of the ribs 20 to press the recording paper P from above. Further, in the scanning direction, the adjacent pressing members 112 have a shorter interval W1 than the length W2 of the pressing members 112. The pressing members 112 serve to prevent the recording paper P from floating upward so as to contact with the ink jet surface 12a.

In the second and third modifications, when the inks land on the recording paper P, then because the recording paper P is deformed due to a decrease in the rigidity of the recording paper P and/or the recording paper P is expanded due to its swelling, each part of the recording paper P changes in the height and the position in the scanning direction. Further, in the second and third modifications, on the recording paper P, the inks are landed in the downstream part from the ink jet surface 12a in the conveyance direction whereas the inks are not landed in the upstream part from the ink jet surface 12a in the conveyance direction. Further, in the third modification, the recording paper P is pressed by the pressing members 112 in the upstream part from the ink jet surface 12a whereas no such pressing member is arranged on the downstream side from the ink jet surface 12a. Then, due to those factors, the recording paper P differs with the position in the scanning direction in the degree of the expansion/contraction in the scanning direction. Therefore, in such cases as the second and third modifications, too, in the same manner as in the first to third embodiments, by determining the correction times $F_1(x)$ and $F_2(x)$, it is possible to suppress the deviation in the connecting part of the adjacent printed images in the conveyance direction.

Further, in the above examples, it is configured that the larger the absolute value of the correction parameter, the longer the time of deviating the jet-timing from the reference timing. However, without being limited to this, it may be configured that the smaller the absolute value of the correction parameter, the longer the time of deviating the jet-timing from the reference timing. Further, it is possible to change the correction parameters according to the print data. For example, when the inks are jetted at a high frequency such as in the case of daubing such that the recording paper P swells to expand greatly, then the correction parameters may be changed to correspond to that case.

Further, in the above examples, the information per se of the value of each parameter is stored in the EEPROM 54. However, without being limited to this, for example, other information about each parameter may be stored in the EEPROM 54, such as information for calculating the value of each parameter, and the like.

Further, the above explanation was made on examples of applying the present teaching to an ink jet printer which carries out printing by jetting inks from nozzles and which carries out single side printing. However, without being limited to this, it is also possible to apply the present teaching to ink jet printers which carry out double side printing. In this case, the parameters used for the back-side printing may be adjusted based on the print-duty of the front-side printing. It is also possible to apply the present teaching to liquid jetting apparatuses, other than ink jet printers, which jet a liquid other than the inks from nozzles.

What is claimed is:

1. A liquid jetting apparatus comprising:
 a conveyor configured to convey a recording medium in a conveyance direction;
 a liquid jet head including a plurality of nozzle groups which are arranged adjacent to each other in the conveyance direction to form an array of nozzles aligned in the conveyance direction;
 a carriage on which the liquid jet head is mounted;
 a carriage moving device configured to move the carriage in a scanning direction intersecting the conveyance direction; and
 a controller configured to control the conveyor, the liquid jet head, and the carriage moving device to:
  print an image on the recording medium based on print data by repeating a scan-printing operation to jet the liquid from the nozzles while moving the carriage in the scanning direction and a conveyance operation to cause the conveyor to convey the recording medium in the conveyance direction after the scan-printing operation is finished; and
  determine, based on a value of a correction parameter, a jet-timing to jet the liquid from the nozzles in the scan-printing operation such that both a first jet-timing in a print area of the recording medium located upstream of a reference position in the scanning direction and a second jet-timing in a print area of the recording medium located downstream of the reference position in the scanning direction deviate with respect to a reference timing, and that a deviation of the first jet-timing from the reference timing is opposite to a deviation of the second jet-timing from the reference timing,
 wherein the correction parameter is set to a same value for the nozzles included in an identical one of the nozzle groups and is set to different values for the nozzles included in different ones of the nozzle groups.

2. The liquid jetting apparatus according to claim 1, wherein the controller is configured to determine the jet-timing to jet the liquid from the nozzle in the scan-printing operation such that the first jet-timing in the print area of the recording medium located upstream of the reference position in the scanning direction is delayed with respect to the reference timing, and that the second jet-timing in the print area of the recording medium located downstream of the reference position in the scanning direction becomes earlier with respect to the reference timing.

3. The liquid jetting apparatus according to claim 1, wherein the controller is configured to determine the jet-timing to jet the liquid from the nozzle in the scan-printing operation such that the first jet-timing in the print area of the recording medium located upstream of the reference position in the scanning direction becomes earlier than the reference timing, and that the second jet-timing in the print area of the recording medium located downstream of the reference position in the scanning direction is delayed with respect to the reference timing.

4. The liquid jetting apparatus according to claim 1, further comprising a memory storing information about the correction parameter.

5. The liquid jetting apparatus according to claim 1, wherein the controller is configured to determine the jet-timing such that the larger the value of the correction parameter, the longer a deviation time of deviating the jet-timing from the reference timing.

6. The liquid jetting apparatus according to claim 1, wherein the correction parameter includes an individual parameter set individually for each of the plurality of nozzle groups in the respective scan-printing operation, and a common parameter set commonly for the plurality of nozzle groups in the respective scan-printing operation.

7. The liquid jetting apparatus according to claim 6, wherein the individual parameters for the plurality of nozzle groups in the respective scan-printing operation is set such that a predetermined value is not less than a difference of the values of the individual parameters for two adjacent ones of the nozzle groups in the conveyance direction; and
the controller is configured to control the conveyor, the liquid jet head, and the carriage moving device to perform printing in a print mode in which the jet-timing is determined based on both the individual parameters and the common parameter.

8. The liquid jetting apparatus according to claim 7, wherein the predetermined value corresponds to one pixel deviation of an image printed in the scan-printing operation in the scanning direction.

9. The liquid jetting apparatus according to claim 1, wherein the controller is configured to:
determine, based on the print data, whether or not there is a part, in an image printed in a certain scan-printing operation which is adjacent in the conveyance direction to an image printed in a previous scan-printing operation right before the certain scan-printing operation, the certain scan-printing operation and the previous scan-printing operation being included in the scan-printing operation, and
determine the value of the correction parameter; and
wherein upon determining the value of the parameter, in a case that the controller determines that there is the part in the image printed in the certain scan-printing operation, the controller determines the value of the correction parameter such that the value of the correction parameter in the certain scan-printing operation for the nozzles constituting a nozzle group on the most downstream side in the conveyance direction is different from the value of the correction parameter in the previous scan-printing operation for the nozzles constituting a nozzle group on the most upstream side in the conveyance direction.

10. The liquid jetting apparatus according to claim 9, wherein the value of the correction parameter is preset for the nozzles constituting other nozzle groups than the nozzle group on the most downstream side in the conveyance direction among the plurality of nozzle groups; and
wherein the controller determines the value of the correction parameter for the nozzles constituting the nozzle group on the most downstream side in the conveyance direction among the plurality of nozzle groups.

11. The liquid jetting apparatus according to claim 1, further comprising:
a pressing member arranged in the scanning direction to press the recording medium conveyed by the conveyor from the liquid jet head side; and
a plurality of support members arranged in the scanning direction to support the recording medium conveyed by the conveyor from the opposite side to the liquid jet head in a position closer to the liquid jet head than the pressing member.

12. The liquid jetting apparatus according to claim 11, wherein the pressing member includes a plurality of pressing members arranged in the scanning direction, and
wherein the plurality of support members are arranged alternatively with the plurality of the pressing members in the scanning direction.

13. The liquid jetting apparatus according to claim 12, wherein the controller determines the jet-timing based on a function which has a variable defined as a displacement from the predetermined position in the scanning direction, and which includes a first function corresponding to a shape of the recording medium formed into a wave shape by the pressing members and the support members, and a second function corresponding to an amount of expansion/contraction of the recording medium in the scanning direction.

14. The liquid jetting apparatus according to claim 13, wherein the second function includes a component in proportion to the displacement, and the correction parameter is a proportionality coefficient of the second function.

15. The liquid jetting apparatus according to claim 1, wherein the reference position is a center position of the recording medium in a width direction of the recording medium.

* * * * *